(12) United States Patent
Harvey et al.

(10) Patent No.: US 11,750,604 B2
(45) Date of Patent: Sep. 5, 2023

(54) INFORMATION PROVIDING SYSTEM AND INFORMATION PROVIDING METHOD

(71) Applicant: Rakuten Group, Inc., Tokyo (JP)

(72) Inventors: James Brian Harvey, Tokyo (JP); Jordan Cotter Scott, Tokyo (JP); Michael Joseph Copeland, Tokyo (JP); Shreya Jagdishrao Sarnaik, Tokyo (JP); Robert J. Milewski, Tokyo (JP); Sneha Rupesh Shinde, Tokyo (JP); Yoann Mikami, Tokyo (JP); Shun Yuki, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/761,750

(22) PCT Filed: Jul. 17, 2019

(86) PCT No.: PCT/JP2019/028089
§ 371 (c)(1),
(2) Date: May 5, 2020

(87) PCT Pub. No.: WO2021/009871
PCT Pub. Date: Jan. 21, 2021

(65) Prior Publication Data
US 2022/0131859 A1   Apr. 28, 2022

(51) Int. Cl.
*H04L 29/06* (2006.01)
*H04L 9/40* (2022.01)
(Continued)

(52) U.S. Cl.
CPC ........ *H04L 63/0876* (2013.01); *H04L 63/083* (2013.01); *G06Q 30/0222* (2013.01); *G06Q 50/30* (2013.01)

(58) Field of Classification Search
CPC . H04L 63/0876; H04L 63/083; H04L 9/0866; H04L 9/32; H04L 9/3228;
(Continued)

(56) References Cited

U.S. PATENT DOCUMENTS

| 11,017,397 B1* | 5/2021 | Nolte | G06Q 20/3274 |
| 2007/0179838 A1* | 8/2007 | Marra | G06Q 30/0222 |
| | | | 705/14.23 |

(Continued)

FOREIGN PATENT DOCUMENTS

| JP | 2002-222271 A | 8/2002 |
| JP | 2009-237687 A | 10/2009 |

OTHER PUBLICATIONS

Joshi et al., Vehicle and Passenger Protection through Cooperative Sensor based Vehicular Networking, Nov. 30, 2017, IEEE, pp. 1-6. (Year: 2017).*

(Continued)

*Primary Examiner* — Philip J Chea
*Assistant Examiner* — Jenise E Jackson
(74) *Attorney, Agent, or Firm* — Sughrue Mion, PLLC

(57) ABSTRACT

An object is to provide an information providing system and an information providing method in which an information providing device can provide information personalized for a user without an input of identification information of the user into the information providing device.

A server device receives, from a terminal device that has acquired device identification information identifying the information providing device, the device identification information and user identification information identifying a user. The server device transmits information for the user identified by the user identification information to the information providing device identified by the device identification information. The information providing device receives (Continued)

the information for the user. The information providing device provides information based on the information for the user.

10 Claims, 13 Drawing Sheets

(51) Int. Cl.
  *G06Q 30/0207* (2023.01)
  *G06Q 50/30* (2012.01)
(58) Field of Classification Search
  CPC .... G06Q 30/0222; G06Q 50/30; G06F 21/31; G06F 21/44; G06F 21/73; H04W 12/06; H04W 12/33; H04W 12/47
  See application file for complete search history.

(56) References Cited

U.S. PATENT DOCUMENTS

| | | | | |
|---|---|---|---|---|
| 2009/0094126 | A1* | 4/2009 | Killian | G06Q 40/02 705/17 |
| 2011/0270764 | A1* | 11/2011 | Mizani Oskui | G06Q 20/325 705/16 |
| 2013/0185124 | A1* | 7/2013 | Aaron | G06Q 20/326 705/13 |
| 2013/0260678 | A1* | 10/2013 | Ikemoto | H04W 28/06 455/39 |
| 2016/0219552 | A1* | 7/2016 | Chen | H04W 4/80 |
| 2016/0358202 | A1* | 12/2016 | Lee | G06Q 30/0238 |
| 2017/0098208 | A1* | 4/2017 | Argyopoulos | H04W 4/80 |
| 2017/0243188 | A1* | 8/2017 | Mahmoudzadehvazifeh | G06Q 20/202 |
| 2018/0018704 | A1* | 1/2018 | Tunnell | G06Q 30/0269 |
| 2018/0349875 | A1* | 12/2018 | Barnett | H04L 67/12 |
| 2019/0325156 | A1* | 10/2019 | Du | G06F 16/2379 |
| 2020/0286069 | A1* | 9/2020 | Pearson | H04W 12/009 |
| 2021/0321223 | A1* | 10/2021 | Adachi | H04W 12/069 |
| 2022/0169206 | A1* | 6/2022 | Moeller | G01V 11/002 |

OTHER PUBLICATIONS

Gyger et al, EasyRide: Active Transponders for a Fare Collection System, Nov. 2001, IEEE, pp. 36-42. (Year: 2001).*
International Search Report for PCT/JP2019/028089 dated Aug. 20, 2019 [PCT/ISA/210].

* cited by examiner

FIG.4

| USER DB | 14a |
|---|---|
| USER ID | |
| NAME | |
| DATE OF BIRTH | |
| GENDER | |
| ADDRESS | |
| E-MAIL ADDRESS | |
| . . . | |

| CHECK-IN MANAGEMENT DB | 14b |
|---|---|
| USER ID | |
| DEVICE ID | |

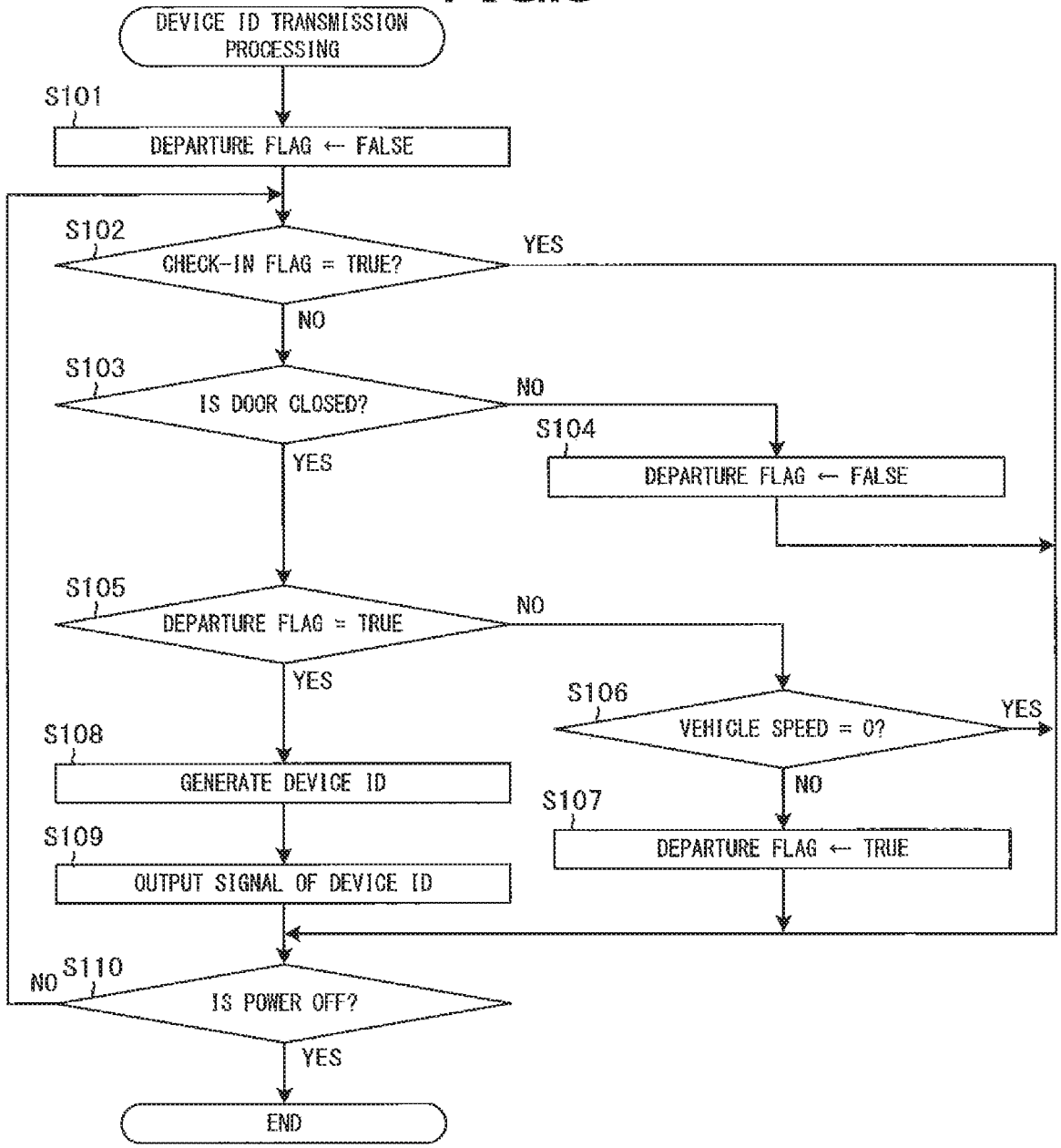

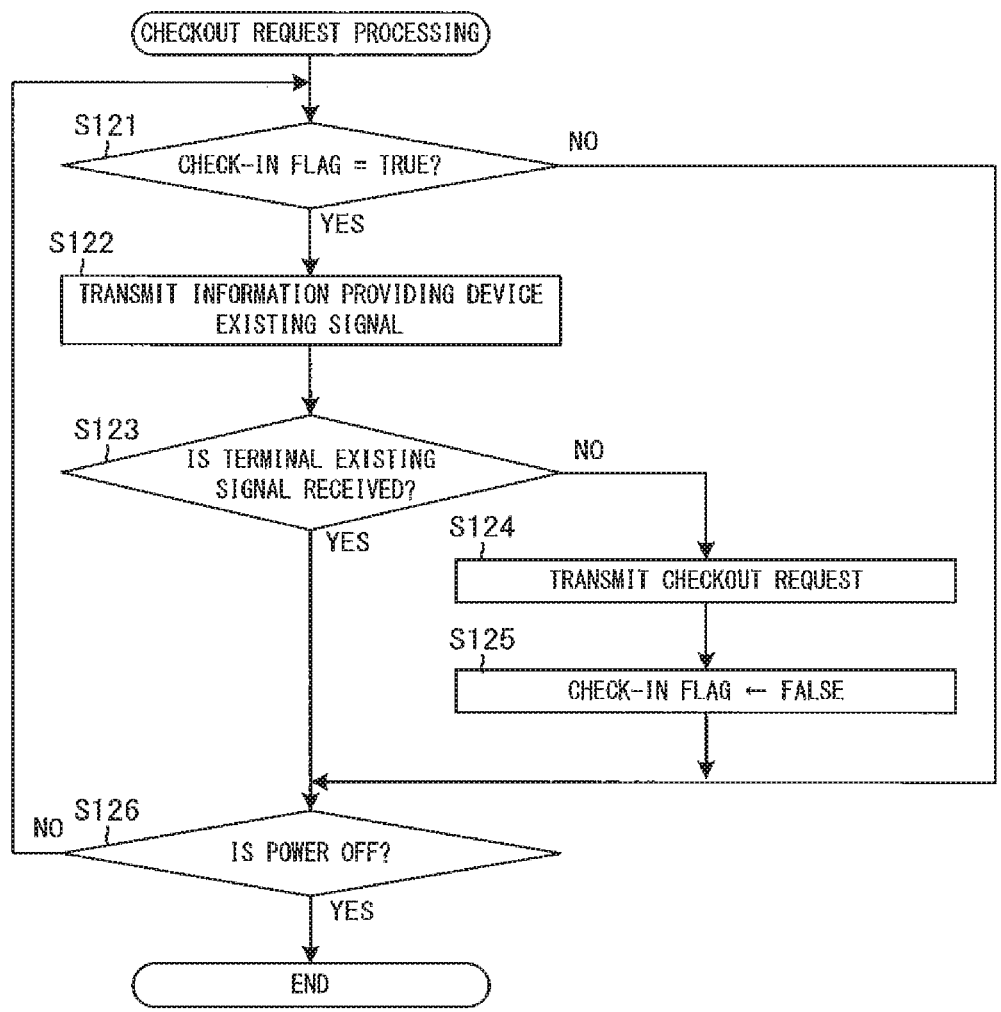

INFORMATION PROVIDING SYSTEM AND INFORMATION PROVIDING METHOD

CROSS REFERENCE TO RELATED APPLICATIONS

This application is a National Stage of International Application No. PCT/JP2019/028089 filed Jul. 17, 2019.

TECHNICAL FIELD

The present invention relates to a technical field of an information providing system and an information providing method to provide information personalized for a user.

BACKGROUND ART

Conventionally, systems have been known in which, with login operation by a user on a specific device such as a terminal device owned by a user, a server device distributes information personalized for the user to the specific device and the specific device performs displaying or the like of the personalized information (for example, Patent Literature 1). The user generally needs to input identification information of the user, a password, or the like for login.

CITATION LIST

Patent Literature

Patent Literature 1: Japanese Patent Application Laid-Open No. 2002-222271

SUMMARY OF INVENTION

Technical Problem

However, there may be a case where an information providing device to perform displaying or the like of information is in a situation where unspecific people can use it since it has been put in a public place or the like, for example. Inputting identification information of a user into such an information providing device is not preferable in terms of security when considering that other users can also use the information providing device.

The present invention is provided in view of the above points, and is to provide an information providing system and an information providing method in which an information providing device can provide information personalized for a user without an input of identification information of the user into the information providing device.

Solution to Problem

In order to solve the above problem, one approach includes an information providing system comprising: a server device that can communicate with a terminal device carried by a user; and an information providing device that can communicate with the server device, wherein the server device includes an identification information receiving means that receives, from the terminal device that has acquired device identification information identifying the information providing device, the device identification information and user identification information identifying the user, and a transmission means that transmits information for the user identified by the received user identification information to the information providing device identified by the received device identification information, and the information providing device includes a for-user information receiving means that receives information for the user transmitted from the server device, and a providing means that provides information based on the received information for the user.

According to this invention, device identification information that identifies an information providing device that a user intends to use and user identification information that identifies the user are transmitted from a user terminal to a server device. The server device transmits information for the user to the information providing device based on the received identification information. The information for the user may be, for example, information to be provided itself or information indicating what information should be provided. Then, the information providing device provides information based on the information for the user. Thus, the information providing device can provide information personalized for the user without an input of the identification information of the user into the information providing device.

Another aspect includes an information providing system, wherein the information providing device further includes an output means that outputs the device identification information.

According to this invention, a terminal device can acquire device identification information output from an information providing device that a user intends to use.

Another aspect includes an information providing system, wherein the output means changes the device identification information to be output each time a predetermined period passes, and the transmission means transmits the information for the user when the received device identification information is device identification information corresponding to a period in which the device identification information is received.

According to this invention, even when a terminal device of a user who used an information providing device in the past transmits device identification information acquired at that time to a server device later, the server device does not transmit information for the user to the information providing device. Thus, it is possible to prevent provision of information personalized for a user different from a user who intends to use the information providing device currently.

Another aspect includes an information providing system, wherein the output means outputs a signal indicating the device identification information, and the identification information receiving means receives the device identification information and the user identification information transmitted from the terminal device when the signal indicating the device identification information has been received by the terminal device.

According to this invention, it is possible to save a user the trouble of inputting device identification information into a terminal device.

Another aspect includes an information providing system, wherein the information providing device is put in a predetermined space separated from the outside, and the output means outputs the signal indicating the device identification information only when a door for entering the predetermined space is closed.

According to this invention, since a signal indicating device identification information hardly reaches the outside of a predetermined space, it is possible to increase the probability that the device identification information is received only by a terminal device of a user in the predetermined space.

The invention according to claim 6 is the information providing system according to claim 5, wherein the information providing device is put in a vehicle, and the output means outputs the device identification information when a movement of the vehicle has been detected.

According to this invention, it is possible to output a signal indicating device identification information when the probability that a user is using a vehicle is high.

The invention according to claim 7 is the information providing system according to any one of claims 4 to 6, wherein the output means outputs a sound wave indicating the device identification information.

According to this invention, since a sound wave is blocked by an obstacle or the sound wave reaching an opposite side of the obstacle is weakened, it becomes easy to limit an area in which a signal indicating device identification information reaches.

Another aspect includes an information providing system, wherein the server device further includes an association means that associates the device identification information and the user identification information received by the identification information receiving means with each other, and the for-user information transmitting means transmits, to the information providing device, the information for the user identified by the user identification information associated with the device identification information of the information providing device.

According to this invention, since an information providing device used by a user and the user are associated, the information providing device can provide information personalized for the user while the association is maintained.

Another aspect includes an information providing system, wherein the server device further includes a dissolving request receiving means that receives, when a predetermined signal transmitted from either one of the information providing device and the terminal device is no longer received by the other device, a dissolving request transmitted from the other device, and a dissolving means that dissolves the association between the device identification information and the user identification information when the dissolving request is received.

According to this invention, when a user moves away from an information providing device and a signal transmitted from either one of the information providing device and a terminal device does not reach the other, association between the information providing device and the user is dissolved. Thus, association can be dissolved when the probability that the user has ended use of the information providing device.

Another aspect includes an information providing system, wherein the information providing device is put in a vehicle in which a fare is paid when a passenger ends use of the vehicle, the information providing device further includes a dissolving request transmitting means that transmits a dissolving request to the server device when an operation to pay the fare is detected, and the server device further includes a dissolving request receiving means that receives the dissolving request from the information providing device, and a dissolving means that dissolves, when the dissolving request is received, the association between the device identification information of the information providing device that has transmitted the dissolving request, and the user identification information.

According to this invention, when a user ends use of a vehicle, association between an information providing device and the user is dissolved. Thus, the association can be dissolved when the probability that a user ends use of the information providing device is high.

Another aspect includes an information providing system, wherein the information providing device further includes an input means to which an operation by the user is input, and a transmission request transmitting means that transmits, to the server device, a transmission request for coupon information to the user based on the input operation, and the server device further includes a transmission request receiving means that receives the transmission request from the information providing device, and a coupon information transmitting means that transmits, when the transmission request is received, the coupon information for the user identified by the user identification information associated with the device identification information of the information providing device that has transmitted the transmission request.

According to this invention, a user can receive coupon information without inputting identification information of the user into an information providing device.

Another aspect includes an information providing method performed by an information providing system comprising: a server device that can communicate with a terminal device carried by a user; and an information providing device that can communicate with the server device, the method comprising: an identification information receiving step in which the server device receives, from the terminal device that has acquired device identification information identifying the information providing device, the device identification information and user identification information identifying the user; a transmission step in which the server device transmits information for the user identified by the received user identification information to the information providing device identified by the received device identification information, and a for-user information receiving step in which the information providing device receives information for the user transmitted from the server device; and a providing step in which the information providing device provides information based on the received information for the user.

Advantageous Effects of Invention

According to the present invention, device identification information that identifies an information providing device that a user intends to use and user identification information that identifies the user are transmitted from a user terminal to a server device. The server device transmits information for the user to the information providing device based on the received identification information. The information for the user may be, for example, information to be provided itself or information indicating what information should be provided. Then, the information providing device provides information based on the information for the user. Thus, the information providing device can provide information personalized for the user without an input of the identification information of the user into the information providing device.

BRIEF DESCRIPTION OF DRAWINGS

FIG. 4 is a view illustrating an example of contents stored in databases.

FIG. 8 is a flowchart illustrating an example of device ID transmission processing executed by the system controller 21 of the information providing device 2 according to the one embodiment.

FIG. 9 is a flowchart illustrating an example of checkout request processing executed by the system controller 21 of the information providing device 2 according to the one embodiment.

DESCRIPTION OF EMBODIMENTS

In the following, an embodiment of the present invention will be described in detail with reference to the drawings. An embodiment described in the following is an embodiment of a case where the present invention is applied to a system in which information provision is performed by an information providing device installed in a taxi.

1. Configuration of Information Providing System

Figure 1:
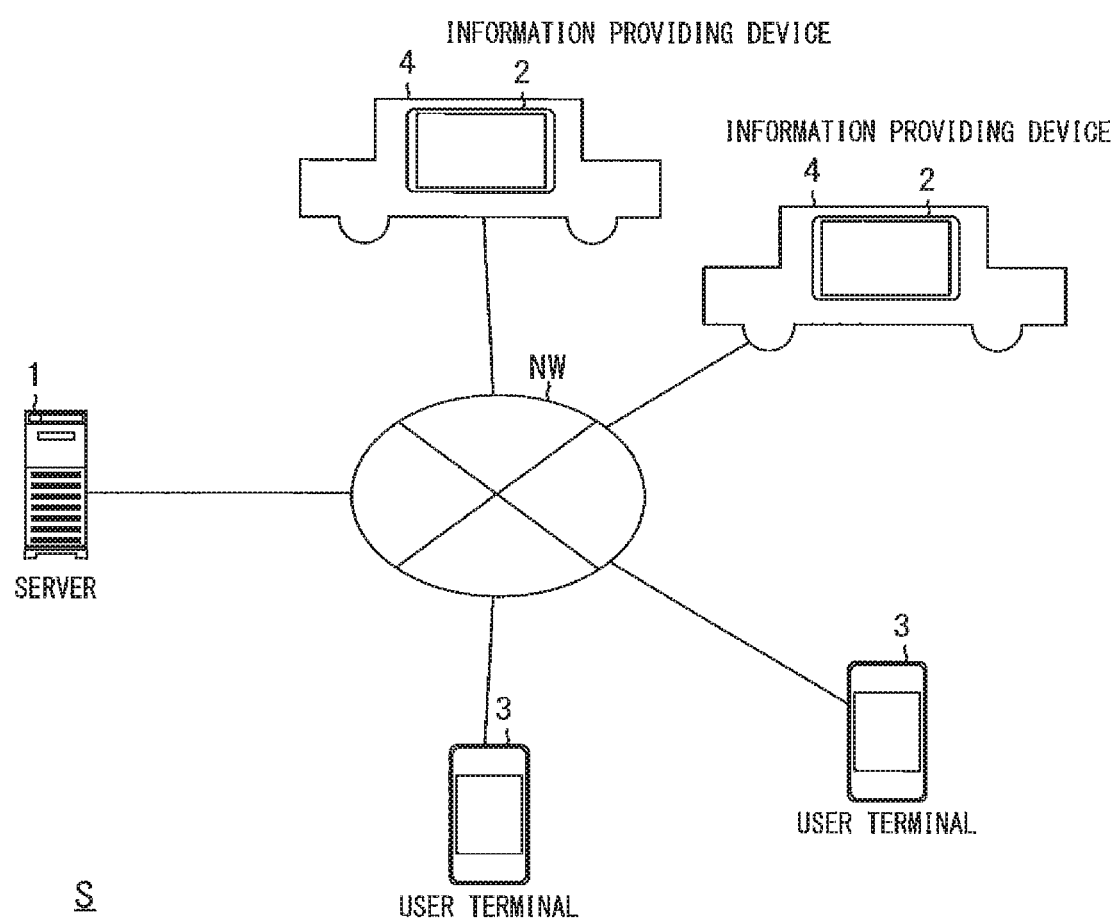
FIG. 1 is a view illustrating an example of a schematic configuration of an information providing system S according to one embodiment.

First, a configuration of an information providing system S according to the present embodiment will be described with reference to FIG. 1. FIG. 1 is a view illustrating an example of a schematic configuration of the information providing system S according to the present embodiment.

As illustrated in FIG. 1, the information providing system S includes a server 1, one or a plurality of information providing devices 2, and a plurality of user terminals 3. The server 1 is an example of an information processing device of the present invention.

The server 1, the information providing devices 2, and the user terminals 3 can transmit and receive data to each other through a network NW by using TCP/IP or the like as a communication protocol, for example. Note that the network NW is built, for example, with the Internet, a dedicated communication line (such as community antenna television (CATV) line), a mobile communication network (including base station or the like), a gateway, and the like.

The server 1 stores information related to users registered as members in the information providing system S. Also, the server 1 performs processing for causing the information providing device 2 to provide information personalized for a user who uses the information providing device 2.

The information providing device 2 provides information personalized for a user. Each information providing device 2 may be put in a predetermined place, for example. The place where the information providing device 2 is put is not specifically limited. For example, the information providing device 2 may be put in a space separated from the outside or may be put in the outside. Examples of a space separated from the outside include the inside of a building, a room, a vehicle, and the like. Examples of the vehicle include an automobile, a ship, an aircraft, and the like. Each information providing device 2 is put in a taxi 4 in the present embodiment. A user can use the taxi 4 as a passenger. When the user ends use of the taxi 4, the user makes a payment of a fare. The information providing device 2 is preferably installed at a position where a passenger can perform operation thereof. For example, the information providing device 2 may be installed on the back of a headrest or a backrest of a driver seat or a passenger seat, or may be installed between the driver seat and the passenger seat, or the like.

Each of the user terminals 3 is carried by a user registered as a member in the information providing system S. The user uses a taxi as a passenger and receives information provision from an information providing device 2 in the taxi. Examples of the user terminal 3 include a mobile information terminal such as a smartphone or a tablet computer, a mobile phone, a personal digital assistant (PDA), a laptop computer, and the like.

Figure 2:
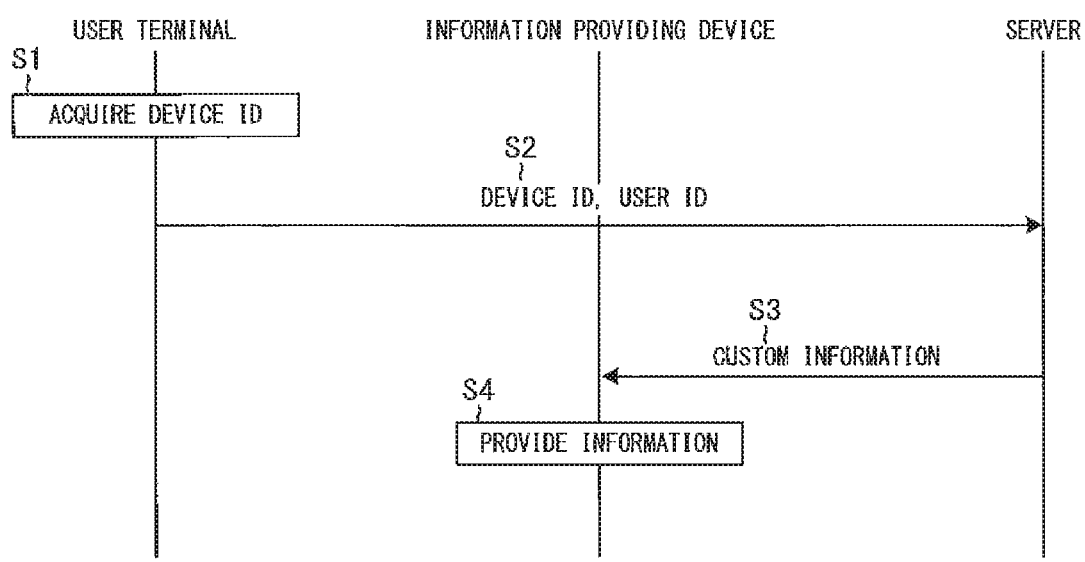
FIG. 2 is a sequence diagram illustrating an operation example of the information providing system S according to the one embodiment.

FIG. 2 is a sequence diagram illustrating an operation example of the information providing system S according to the present embodiment. As illustrated in FIG. 2, a user terminal 3 acquires a device ID of an information providing device 1 that a user intends to use (step S1). The device ID is information that identifies the information providing device 2. The device ID may be, for example, an IP address, a media access control (MAC) address, or other information or the like of an information providing device 2. For example, the device ID may be printed on paper or the like, or may be output by the information providing device 2. The user terminal 3 transmits, to a server 1, the acquired device ID and a user ID of the user who owns the user terminal 3 (step S2). The user ID is information that identifies the user.

The server 1 transmits custom information for the user identified by the user ID received from the user terminal 3 to the information providing device 2 identified by the device ID received along with the user ID (step S3). The custom information is information for causing the information providing device 2 to provide information personalized for the user. The custom information may be information itself to be provided to the user or information indicating what information is to be provided to the user. The information providing device 2 provides information based on the custom information received from the server 1 (step S4).

In such a manner, in the information providing system S, the information providing device 2 provides information personalized for a user without an input of authentication information such as a user ID and a password by the user into the information providing device 2. Also, the server 1 needs not transmit authentication information or other information related to the user to the information providing device 2.

Prior to the transmission of the custom information, the server 1 may execute processing for check-in (or login). In the present embodiment, the check-in means that the user declares that he/she will use the information providing device 2. The processing for the check-in is, for example, associating a device ID with a user ID. Also, the server 1 may execute processing for checkout (or logout). The checkout means that user declares that he/she will end use of the information providing device 2. The processing for the checkout is to dissolve association between a device ID and a user ID, for example. Accordingly, the user can receive provision of information, which is personalized for the user, from the information providing device 2 in a period from the check-in to the checkout.

After the check-in, the information providing device 2 may provide information related to coupon information. The coupon information is information indicating a discount ticket, a complimentary ticket, or the like that can be used by the user, for example, in purchasing an item for sale or use of a service. Based on a request transmitted from the information providing device 2 based on a user operation on the information providing device 2, the server 1 may transmit the coupon information for the user. Accordingly, the user terminal 3 receives the coupon information. The user can receive a discount, preferential treatment, or the like by causing the user terminal 3 to display the coupon information and presenting the coupon information.

2. Configuration of Server

Figure 3A:
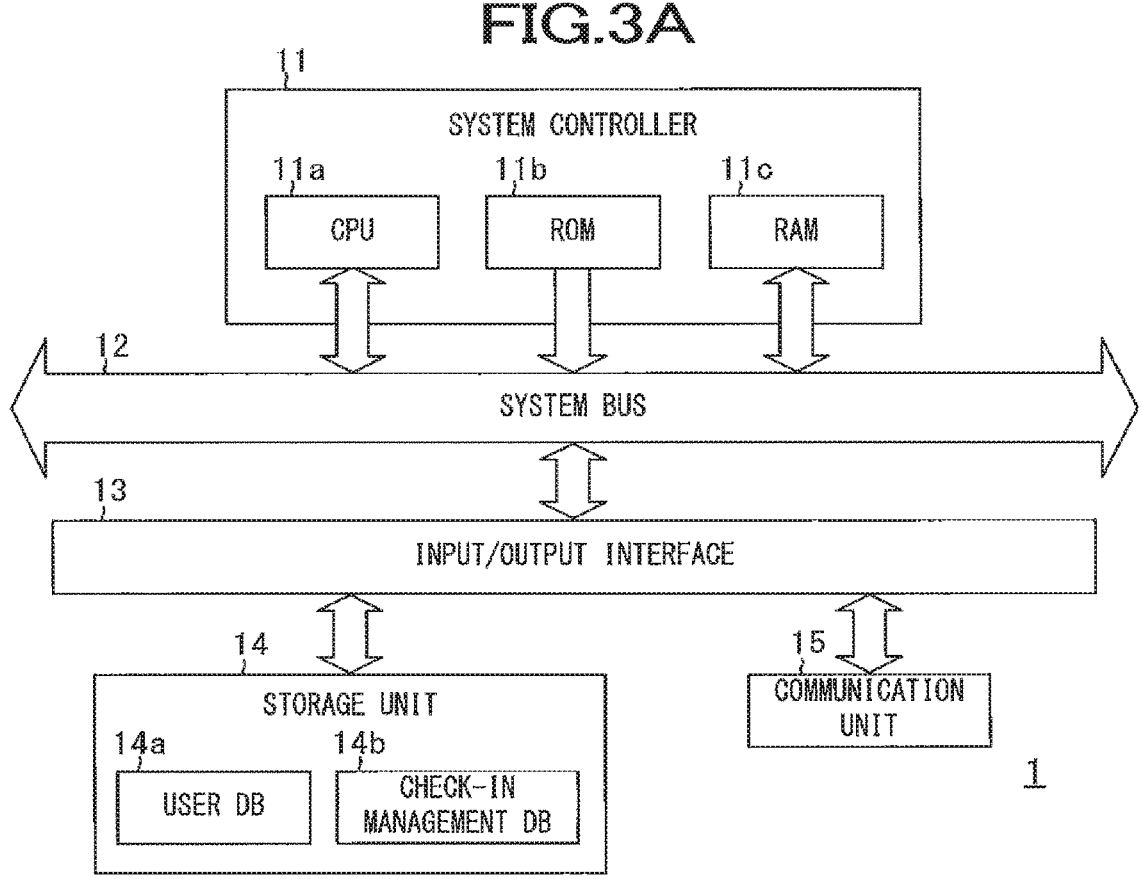
FIG. 3A is a block diagram illustrating an example of a schematic configuration of a server 1 according to the one embodiment.

Next, a configuration of a server 1 will be described with reference to FIG. 3A and FIG. 4. FIG. 3A is a block diagram illustrating an example of a schematic configuration of the server 1 according to the present embodiment. As illustrated in FIG. 3A, the server 1 includes a system controller 11, a system bus 12, an input/output interface 13, a storage unit 14, and a communication unit 15. The system controller 11 and the input/output interface 13 are connected through the system bus 12.

The system controller 11 includes a central processing unit (CPU) 11*a*, a read only memory (ROM) 11*b*, a random access memory (RAM) 11*c*, and the like. The CPU 11*a* is an example of a processor. Note that the present invention can be also applied to various processors different from the CPU. Each of the storage unit 14, the ROM 11*b*, and the RAM 11*c* is an example of a memory. Note that the present invention can be also applied to various memories different from a hard disk, the ROM and the RAM.

The input/output interface 13 performs interface processing between the storage unit 14 and the communication unit 15, and the system controller 11.

The storage unit 14 includes, for example, a hard disk drive or the like. This storage unit 14 stores databases such as a user DB 14*a* and a check-in management DB 14*b*. "DB" is an abbreviation for a database.

FIG. 4 is a view illustrating an example of contents stored in databases. The user DB 14*a* stores user information related to users registered as members in the information providing system S. More specifically, user attributes such as a user ID, a name, a date of birth, gender, an address, and an e-mail address are stored in association with each user in the user DB 14*a*.

The check-in management DB 14*b* stores information related to users who check in in the information providing system S. More specifically, a user ID and a device ID are stored in the check-in management DB 14*b* for each user that checks in the information providing system S. The user ID indicates a user that checks in the information providing system S. The device ID indicates an information providing device 2 that provides information to a user indicated by the associated user ID.

In addition to the user information, the storage unit 14 may further store a database in which information with which characteristics, attributes, interest, preferences, and the like of users can be specified is registered. As examples of such information, histories of usage of information providing devices 2 by users, histories of usage of contents by the users, histories of purchase of items for sale by the users at shopping sites or shops, histories of usage of services by the users, information indicating favorites of the users, answers to questionnaires, information input or set by the users, and the like may be stored. Based on such information, the server 1 may determine what information will be provided to a user.

Also, the storage unit 14 stores various kinds of content as information to be provided to the users. Examples of the content include moving image data, sound data, music data, image data, text data, web pages, electronic documents, application programs, advertisement information, coupon information, recommendation information, and the like.

Furthermore, the storage unit 14 stores various programs such as an operating system, a database management system (DBMS), and a server program. The server program is a program for transmitting custom information to an information providing device 2. The server program includes various program codes. Note that the server program may be acquired from another server device or the like through a network NW, or may be recorded in a recording medium such as a magnetic tape, an optical disk, or a memory card and read through a drive device, for example. Also, the server program may be a program product.

The communication unit 15 is connected to a user terminal 3 through the network NW and controls a communication state to the user terminal 3.

3. Configuration of Information Providing Device

Figure 5:
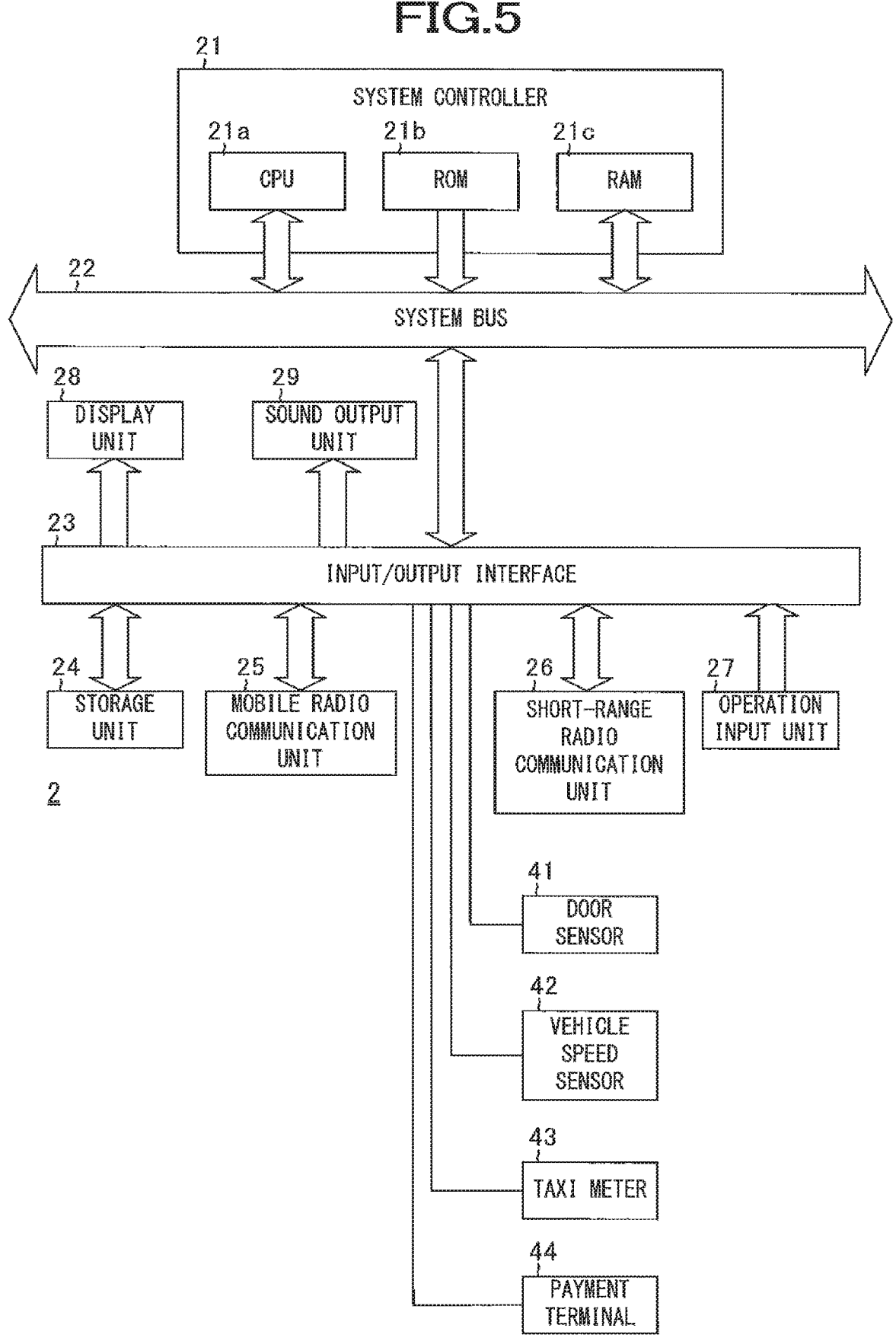
FIG. 5 is a block diagram illustrating an example of a schematic configuration of an information providing device 2 according to the one embodiment.

Next, a configuration of an information providing device 2 will be described with reference to FIG. 5. FIG. 5 is a block diagram illustrating an example of a schematic configuration of the information providing device 2 according to the present embodiment. As illustrated in FIG. 5, the information providing device 2 includes a system controller 21, a system bus 22, an input/output interface 23, a storage unit 24, a mobile radio communication unit 25, a short-range radio communication unit 26, an operation input unit 27, a display unit 28, and a sound output unit 29. The system controller 21 and the input/output interface 23 are connected through the system bus 22.

The system controller 21 includes a CPU 21*a*, a ROM 21*b*, a RAM 21*c*, and the like.

The input/output interface 23 performs interface processing between the storage unit 24 to the sound output unit 29 and the system controller 21. Also, a door sensor 41, a vehicle speed sensor 42, a taxi meter 43, and a payment terminal 44 may be connected to the input/output interface 23. The door sensor 41 to the payment terminal 44 are provided in the taxi 4. The door sensor 41 detects an opened/closed state of a door of the taxi 4. For example, the door sensor 41 may be provided in each door. The vehicle speed sensor 42 detects a vehicle speed of the taxi 4. The taxi meter 43 automatically calculates and displays a fare according to traveling time or passenger loaded time of the taxi 4. The taxi meter 43 includes a display unit that displays the fare, a payment button for fixing the fare, and the like. The payment terminal 44 is a terminal device for a payment of a fare with a credit card, an electronic money, or the like. The payment terminal 44 includes, for example, a reader unit that reads a credit card number, identification information of a member of an electronic money, and the like, a payment button for execution of payment, and the like.

The storage unit 24 includes, for example, a hard disk drive or the like. This storage unit 24 stores content downloaded from the server 1. The information providing device 2 may previously store all content stored in the server 1 in the storage unit 24, or may previously store a part of the content in the storage unit 24. For example, the information providing device 2 may download the content when connected to a wireless local area network (LAN) of a taxi company. Alternatively, the information providing device 2 may download the content timely when necessary.

Moreover, the storage unit 24 stores various programs such as an operating system and an information providing program. The information providing program is a program for providing information to the user. The information providing program includes various program codes. Note that the information providing program may be acquired from a server device such as the server 1 through the network NW, or may be recorded in a recording medium such as a magnetic tape, an optical disk, or a memory card and read through a drive device, for example. Also, the information providing program may be a program product.

The mobile radio communication unit 25 has a radio communication function to use a mobile communication network. The mobile communication network includes, for example, a telephone circuit switching network, and a data communication packet switching network for connection to the Internet. The mobile radio communication unit 25 performs radio communication with the nearest base station through an antenna, and is connected to the network NW through the base station and the mobile communication network. The information providing device 2 communicates with the server 1 by using the mobile radio communication unit 25.

The short-range radio communication unit 26 has a short-range radio communication function having a communication distance of around a several millimeters to a several meters. A standard for short-range radio may be, for example, Bluetooth (registered trademark) low energy (BLE), ZigBee (registered trademark), near field radio communication (NFC), or the like. Through an antenna, the short-range radio communication unit 26 performs radio communication with another radio communication device having a short-range radio communication function. The information providing device 2 communicates with a user terminal 3 by using the short-range radio communication unit 26.

The operation input unit 27 receives operation by a user and outputs a signal corresponding to operation contents to the system controller 21. Examples of the operation input unit 27 include a button, a switch, a touch panel, and the like.

The display unit 28 displays information such as images, characters, and the like under control by the system controller 21. Examples of the display unit 28 include a liquid crystal panel, an organic light emitting (EL) panel, and the like.

The sound output unit 29 outputs a sound wave under control by the system controller 21. In the present embodiment, the sound wave may include an ultrasonic wave. For example, the sound output unit 29 may include at least one of a speaker that can output a sound wave of an audible frequency and a speaker that can output an ultrasonic wave.

4. Configuration of User Terminal

Figure 7A:
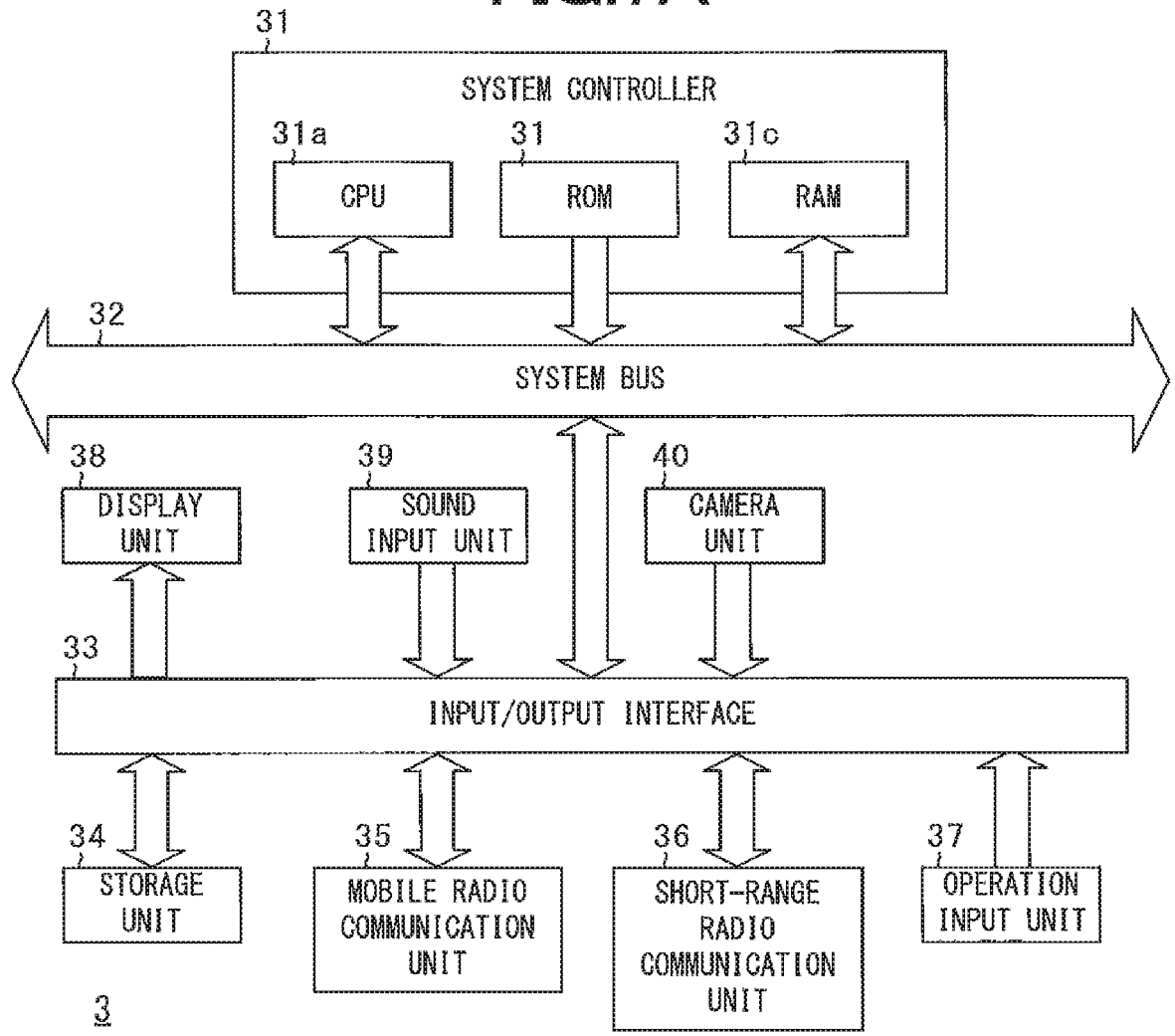
FIG. 7A is a block diagram illustrating an example of a schematic configuration of a user terminal 3 according to the one embodiment.

Next, a configuration of a user terminal 3 will be described with reference to FIG. 7A. FIG. 7A is a block diagram illustrating an example of a schematic configuration of the user terminal 3 according to the present embodiment. As illustrated in FIG. 7A, the user terminal 3 includes a system controller 31, a system bus 32, an input/output interface 33, a storage unit 34, a mobile radio communication unit 35, a short-range radio communication unit 36, an operation input unit 37, a display unit 38, a sound input unit 39, and a camera unit 40. The system controller 31 and the input/output interface 33 are connected through the system bus 32.

The system controller 31 includes a CPU 31a, a ROM 31b, a RAM 31c, and the like.

The input/output interface 33 performs interface processing between the storage unit 34 to the camera unit 40 and the system controller 31.

The storage unit 34 includes, for example, a flash memory, a hard disk drive, or the like. This storage unit 34 stores various programs such as an operating system and a terminal program. The terminal program is a program for performing processing to use the information providing system S. Note that the terminal program may be acquired from a server device such as the server 1 through the network NW, or may be recorded in a recording medium such as a magnetic tape, an optical disk, or a memory card and read through a drive device, for example. Also, the terminal program may be a program product.

The mobile radio communication unit 35 has a radio communication function to use a mobile communication network. The mobile radio communication unit 35 performs radio communication with the nearest base station through an antenna, and is connected to the network NW through the base station and the mobile communication network. The user terminal 3 communicates with the server 1 by using the mobile radio communication unit 35.

The short-range radio communication unit 36 has a short-range radio communication function having a communication distance of around a several millimeters to a several meters. A standard for short-range radio may be, for example, BLE, ZigBee (registered trademark), NFC, or the like. Through an antenna, the short-range radio communication unit 36 performs radio communication with another communication device having a short-range radio communication function. The user terminal 3 communicates with an information providing device 2 by using the short-range radio communication unit 36.

The operation input unit 37 receives operation by a user and outputs a signal corresponding to operation contents to the system controller 31. Examples of the operation input unit 37 include a button, a switch, a touch panel, keys, and the like.

The display unit 38 displays information such as images and characters under control by the system controller 31. Examples of the display unit 38 include a liquid crystal display, an organic EL display, and the like.

The sound input unit 39 is a device that converts a sound wave into a sound signal, and outputs the sound signal to the system controller 31. The sound input unit 39 may be a microphone, for example.

The camera unit 40 captures a still image or a moving image. The camera unit 40, for example, includes a colony collapse disorder (CCD) image sensor or the like.

5. Functional Outline

Next, functional outlines of the system controller 11 of the server 1, the system controller 21 of the information providing device 2, and the system controller 31 of the user terminal 3 will be described with reference to FIG. 3B, FIG. 6, and FIG. 7B.

Figure 3B:
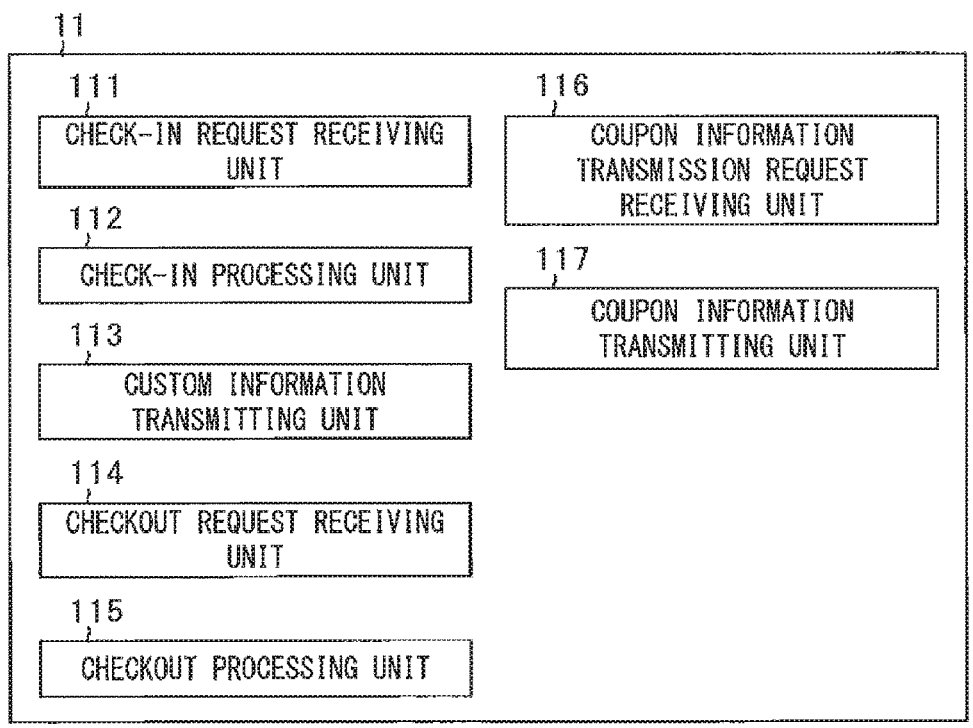
FIG. 3B is a view illustrating an example of functional blocks of a system controller 11 of the server 1 according to the one embodiment.

FIG. 3B is a view illustrating an example of functional blocks of the system controller 11 of the server 1 according to the present embodiment. The CPU 11a reads and executes various codes included in the server program and thereby the system controller 11 functions as a check-in request receiving unit 111, a check-in processing unit 112, a custom information transmitting unit 113, a checkout request receiving unit 114, a checkout processing unit 115, a coupon information transmission request receiving unit 116, a coupon information transmitting unit 117, and the like, as illustrated in FIG. 3B. The check-in request receiving unit 111 is an example of an identification information receiving means of the present invention. The check-in processing unit 112 is an example of an association means of the present invention. The custom information transmitting unit 113 is an example of a transmission means of the present invention. The checkout request receiving unit 114 is an example of a dissolving request receiving means of the present invention. The checkout processing unit 115 is an example of a dissolving means of the present invention. The coupon information transmission request receiving unit 116 is an example of a transmission request receiving means of the present invention. The coupon information transmitting unit 117 is an example of a coupon information transmitting means of the present invention.

Figure 6:
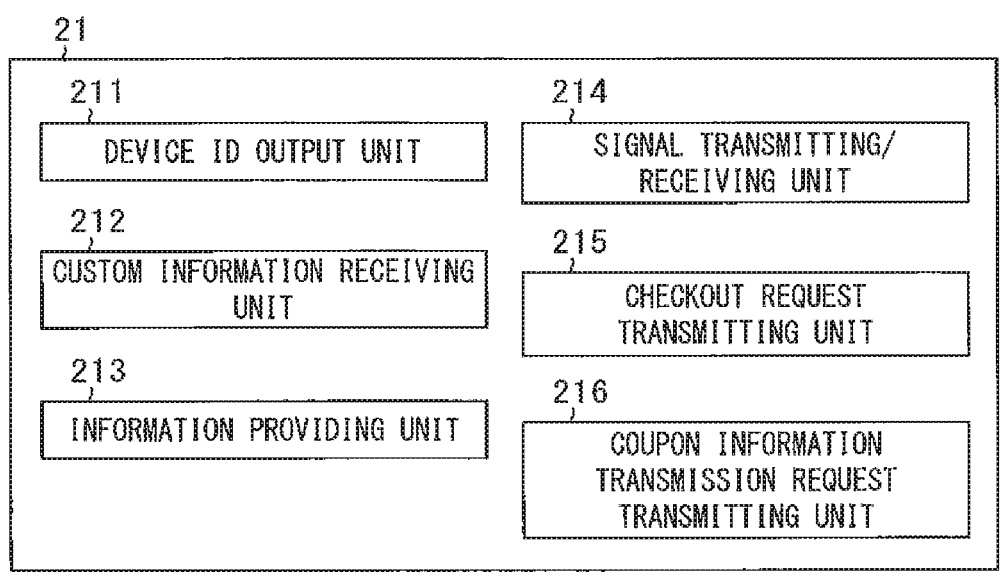
FIG. 6 is a view illustrating an example of a functional block of a system controller 21 of the information providing device 2 according to the one embodiment.

FIG. 6 is a view illustrating an example of functional blocks of the system controller 21 of the information providing device 2 according to the present embodiment. The CPU 21a reads and executes various codes included in the information providing program and thereby the system controller 21 functions as a device ID output unit 211, a custom information receiving unit 212, an information providing unit 213, a signal transmitting/receiving unit 214, a checkout request transmitting unit 215, a coupon information transmission request transmitting unit 216, and the like, as illustrated in FIG. 6. The device ID output unit 211 is an example of an output means of the present invention. The custom information receiving unit 212 is an example of a for-user information receiving means of the present invention. The information providing unit 213 is an example of a providing means of the present invention. The checkout request transmitting unit 215 is an example of a dissolving request transmitting means of the present invention. The coupon information transmission request transmitting unit 216 is an example of a coupon information transmitting means of the present invention.

Figure 7B:
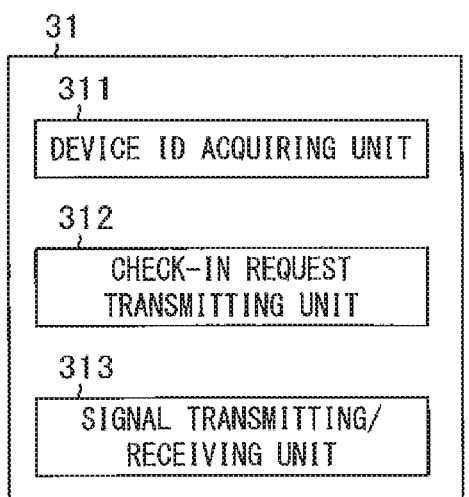
FIG. 7B is a view illustrating an example of functional blocks of a system controller 31 of the user terminal 3 according to the one embodiment.

FIG. 7B is a view illustrating an example of functional blocks of the system controller 31 of the user terminal 3 according to the present embodiment. The CPU 31a reads and executes various codes included in the terminal program and thereby the system controller 31 functions as a device ID acquiring unit 311, a check-in request transmitting unit 312, a signal transmitting/receiving unit 313, and the like, as illustrated in FIG. 7B.

5-1. Output and Acquisition of Device ID

The device ID output unit 211 of the information providing device 2 outputs a device ID of the information providing device 2 including a system controller 21 that functions as the device ID output unit 211. If a user terminal 3 acquires the device ID printed on paper or the like, the device ID output unit 211 is not necessary.

The device ID output unit 211 may cause the short-range radio communication unit 26 to output a signal indicating the device ID by short-range radio, for example. As described above, a standard for the short-range radio may be BLE, ZigBee (registered trademark), NFC, or the like. Alternatively, the device ID output unit 211 may cause the sound output unit 29 to output a device ID with a sound wave. Since the sound wave is blocked by an obstacle or the sound wave reaching an opposite side of the obstacle is weakened, it becomes easier to limit an area that the signal indicating the device ID reaches. For example, a sound reading the device ID may be output, or an ultrasonic signal indicating the device ID may be output. Alternatively, the device ID output unit 211 may cause the display unit 28 to display the device ID. For example, characters, a barcode, a two-dimensional code, or the like indicating the device ID may be displayed.

The device ID output unit 211 may output the device ID when predetermined operation is performed by a user, or may output the device ID continuously or intermittently.

The device ID output unit 211 may output a signal indicating the device ID only when a door for entering a space in which the information providing device 2 has been put is closed. Accordingly, the signal indicating the device ID hardly reaches the outside of the space. Thus, the probability that the device ID is received only by a user terminal 3 of a user in the space can be increased. That is, the probability that the device ID is received only by a user terminal 3 of a user who is in a situation of being able to use the information providing device 2 can be increased. Specifically, if the signal indicating the device ID is output with the sound wave, the signal hardly reaches the outside. For example, the device ID output unit 211 acquires an opened/closed state of each door of a taxi 4 from a door sensor 41. The device ID output unit 211 outputs the signal indicating the device ID when all the doors are closed.

The device ID output unit 211 may output the signal indicating the device ID only when the door for entering a vehicle in which the information providing device 2 has been put is closed and movement of the vehicle has been detected. When the vehicle moves at once in a state in which the door is closed, it indicates that someone is on the vehicle. Thus, the signal indicating the device ID can be output when the probability that the user is using the vehicle is high. Once the vehicle moves, the device ID output unit 211 may output the signal indicating the device ID as long as the door is closed even after the vehicle stops thereafter. For example, based on a vehicle speed detected by the vehicle speed sensor 42, the device ID output unit 211 determines whether the taxi 4 moves.

The device ID output unit 211 may change a device ID to be output each time a predetermined period passes. That is, the device ID output unit 211 generates a so-called one-time ID as the device ID. This enhances security. More specifically, the server 1 that receives the device ID from a user terminal 3 may permit check-in and transmit custom information to the information providing device 2 only in a case of determining that the received device ID is the device ID corresponding to a period in which the device ID is received. Thus, even when a user terminal 3 of a user who used the information providing device 2 in the past but who is not currently using the information providing device 2 transmits the device ID, which is acquired from the information providing device in the past, to the server 1 now, the server 1 does not transmit custom information for the user to the information providing device 2. Accordingly, it is possible to prevent provision of information personalized for a user different from a user who is currently about to use the information providing device 2.

Various methods for changing or generating the device ID are conceivable. For example, the device ID output unit 211 may generate the device ID by using a current date and time. In this case, time synchronization is preferably performed between the information providing device 2 and the server 1. For example, the device ID output unit 211 may extract a part, which is necessary for specifying a current period, from current date and time information and generate key information from the extracted part by using predetermined algorithm. The device ID output unit 211 may encrypt an original device ID such as an IP address, a MAC address, or other information of the information providing device by symmetric-key cryptography using the generated key information. The device ID output unit 211 may output the encrypted device ID.

The device ID acquiring unit 311 of the user terminal 3 acquires a device ID that identifies an information providing device. For example, if the information providing device 2 transmits the signal indicating the device ID by short-range radio, the device ID acquiring unit 311 causes the short-range radio communication unit 36 to receive this signal. If the information providing device 2 outputs the device ID with the sound wave, the device ID acquiring unit 311 acquires the device ID through the sound input unit 39. In order to control power consumption, the device ID acquiring unit 311 may periodically turn on an input by the sound input unit 39 only for a short period of time. If the information providing device 2 displays the characters indicating the device ID, or if the characters indicating the device ID are printed on the paper or the like, the user inputs the displayed device ID by using an operation input unit 37. If the information providing device 2 displays the two-dimensional code or the barcode indicating the device ID, or when the two-dimensional code or the barcode is printed on the paper or the like, the device ID acquiring unit 311 photographs the two-dimensional code or the barcode with the camera unit 40 and decrypts the device ID from an image.

5-2. Check-in

When the device ID is acquired by the device ID acquiring unit 311, the check-in request transmitting unit 312 of the user terminal 3 transmits, to the server 1, the device ID and a user ID that identifies a user who uses the user terminal 3. The user ID to be transmitted may be previously input by the user and stored in the user terminal 3, or may be input by the user each time transmission is performed.

The check-in request receiving unit 111 of the server 1 receives the device ID and the user ID transmitted from the user terminal 3.

The check-in processing unit 112 of the server 1 associates the received device ID with the user ID. For example, the check-in processing unit 112 may store the device ID and the user ID in the check-in management DB 14b in association with each other.

The check-in processing unit 112 may associate the device ID with the user ID only when user authentication is successful. For example, the check-in request transmitting unit 312 transmits a check-in request including the device ID, the user ID, and a password to the server 1. The password to be transmitted may be previously input by the user and stored in the user terminal 3, or may be input by the user each time transmission is performed. The check-in processing unit 112 performs user authentication by using the user ID and the password included in the check-in request and a user ID and a password stored in the user DB 14a.

The check-in processing unit 112 may associate the device ID with the user ID only when the device ID received from the user terminal 3 is correct. For example, the storage unit 14 of the server 1 may store a list of device IDs. The check-in processing unit 112 may associate the device ID with the user ID when the received device ID corresponds to any of the device IDs in the list.

If the device ID to be output is changed by the information providing device 2 in each predetermined period, the check-in processing unit 112 may perform association only when the device ID received from the user terminal 3 is a device ID corresponding to a period in which this device ID is received. For example, the check-in processing unit 112 extracts a part, which is necessary for specifying a current period, from current date and time information and generates key information from the extracted part by using algorithm that is the same as the algorithm used by the information providing device 2. The check-in processing unit 112 decrypts the device ID by using the generated key information. When the decrypted device ID corresponds to any of the device IDs in the list, the check-in processing unit 112 determines that the device ID received from the user terminal 3 is the device ID corresponding to the period in which this device ID is received.

5-3. Transmission of Custom Information

The custom information transmitting unit 113 of the server 1 transmits custom information, which is for a user identified by the user ID received from the user terminal 3, to the information providing device 2 identified by the device ID received from the user terminal 3. For example, the custom information transmitting unit 113 transmits custom information, which is for the user identified by the user ID stored in the check-in management DB 14b, to the information providing device 2 identified by the device ID stored in the check-in management DB 14b in association with the user ID.

As described above, the custom information may be information (content) itself provided to the user, or information indicating what information is provided to the user (and in what order pieces of information are provided). Based on the user DB 14a and other information that can specify characteristics, attributes, interest, preferences, and the like of the user, the custom information transmitting unit 113 determines what information should be provided. That is, the custom information transmitting unit 113 determines to provide information corresponding to the characteristics, the attributes, the interest, the preferences, and the like of the user identified by the user ID. A method for personalizing the provided information may be any method.

Examples of transmission timing of the custom information includes a time of check-in, a timing when personalized information becomes necessary according to operation on the information providing device 2 by the user, a timing when provided information is automatically changed, and the like.

5-4. Information Provision

The custom information receiving unit 212 of the information providing device 2 receives the custom information transmitted from the server 1. The information providing unit 213 of the information providing device 2 provides information based on the received custom information. For example, the information providing unit 213 may cause content included in the custom information to be displayed on the display unit 28 or output by the sound output unit 29. Alternatively, the information providing unit 213 may acquire content indicated by the custom information from the storage unit 14 and cause the acquired content to be displayed on the display unit 28 or output by the sound output unit 29.

Note that the check-in processing unit 112 of the server 1 may issue an access token of the user indicated by the user ID when user authentication is successful. The access token may be what is prescribed in OAuth 2.0. The custom information transmitting unit 113 of the server 1 may transmit the custom information to the information providing device 2 along with the issued access token. Then, the information providing unit 213 may verify the access token received from the server 1 and provide information based on the received custom information only when the access token is valid. For example, the check-in processing unit 112 may generate an access token by using a private key, and the information providing unit 213 may verify validity of the access token by using a public key. Accordingly, security can be improved.

5-5. Transmission of Coupon Information

The coupon information transmission request transmitting unit 216 of the information providing device 2 transmits, to the server 1, a transmission request for coupon information for a user based on operation input into the operation input unit 27 by the user. For example, information related to a coupon that can be used in a facility corresponding to characteristics, attributes, interest, preferences, and the like of the user may be displayed on the display unit 28. When the user performs operation for requesting issue of this coupon, the coupon information transmission request transmitting unit 216 may transmit a coupon information transmission request. Alternatively, when a map around a current position or a destination of the user is displayed on the display unit 28, marks of facilities where coupons can be used may be displayed on this map. When the user designates any mark, the coupon information transmission request transmitting unit 216 may transmit the coupon information transmission request. The coupon information transmission request may include the device ID and a coupon ID, for example.

The coupon information transmission request receiving unit 116 of the server 1 receives the coupon information transmission request transmitted from the information providing device 2. When the coupon information transmission request is received, the coupon information transmitting unit 117 of the server 1 transmits coupon information for a user identified by a user ID associated with a device ID of the information providing device 2 that has transmitted this coupon information transmission request. The coupon information transmitting unit 117 acquires the device ID from the coupon information transmission request and acquires a user ID associated with this device ID from the check-in management DB 14b. The coupon information transmitting unit 117 may directly transmit coupon information to a user terminal 3 used by a user identified by the acquired user ID, or may transmit the coupon information by an e-mail addressed to the user. In a case of transmitting an e-mail, the coupon information transmitting unit 117 acquires an e-mail address corresponding to the acquired user ID from the user DB 14a.

5-6. Checkout

The checkout processing unit 115 of the server 1 dissolves association between the device ID and the user ID when a predetermined condition is satisfied. For example, the checkout processing unit 115 may delete the device ID and the user ID stored in association with each other from the check-in management DB 14b.

For example, an information providing device 2 or a user terminal 3 may transmit a checkout request to the server 1 when a user performs checkout operation on the information providing device 2 or the user terminal 3. If the information providing device 2 transmits the checkout request, this checkout request may include a device ID of the information providing device 2. The checkout processing unit 115 dissolves association between the device ID included in the checkout request and a user ID associated with this device ID. If the user terminal 3 transmits the checkout request, this checkout request may include a user ID of a user that uses the user terminal 3. The checkout processing unit 115 dissolves association between the user ID included in the checkout request and a device ID associated with this user ID.

The checkout processing unit 115 may automatically dissolve the association without the user operation. For example, the information providing device 2 or the user terminal 3 may automatically transmit the checkout request to the server 1 based on a communication condition between the information providing device 2 and the user terminal 3. For example, when a predetermined signal transmitted from either one of the information providing device 2 and the user terminal 3 (hereinafter referred to as signal transmission-side device) is not received by the other device (hereinafter referred to as signal reception-side device), the signal reception-side device transmits the checkout request to the server 1. Accordingly, automatic checkout becomes possible when the user ends use of the information providing device 2 and moves away from the information providing device 2. When the user moves away from the information providing device 2 and a signal transmitted from the signal transmission-side device does not reach the signal reception-side device, the association is dissolved. Thus, the association can be automatically dissolved when there is high probability that the user has ended use of the information providing device 2.

For example, the signal transmitting/receiving unit 214 of the information providing device 2 may output an information providing device existing signal continuously or intermittently. The information providing device existing signal is, for example, a signal notifying existence of the information providing device 2 or a signal requesting a response from the user terminal 3. The information providing device existing signal may or may not be a signal indicating the device ID. The information providing device existing signal may be transmitted, for example, by short-range radio or an ultrasonic wave.

A signal transmitting/receiving unit 313 of the user terminal 3 receives the information providing device existing signal output from the information providing device 2. In a case of receiving the information providing device existing signal, the signal transmitting/receiving unit 313 outputs a terminal existing signal in response thereto. The terminal existing signal is a signal notifying existence of the user terminal 3, for example. The terminal existing signal may be transmitted, for example, by short-range radio.

The signal transmitting/receiving unit 214 of the information providing device 2 receives the terminal existing signal transmitted from the user terminal 3 as a response to the information providing device existing signal. The checkout request transmitting unit 215 of the information providing device 2 transmits the checkout request to the server 1 when the terminal existing signal is no longer received from the user terminal 3.

Alternatively, instead of the information providing device transmitting the checkout request, the signal transmitting/receiving unit 313 of the user terminal 3 may transmit the checkout request to the server 1 when the information providing device existing signal is no longer received from the information providing device 2.

Alternatively, the signal transmitting/receiving unit 214 of the information providing device 2 may not transmit the information providing device existing signal, and the signal transmitting/receiving unit 313 of the user terminal 3 may output the terminal existing signal continuously or intermittently. The checkout request transmitting unit 215 of the information providing device 2 may transmit the checkout request to the server 1 when the terminal existing signal is no longer received from the user terminal 3.

Note that by using a sound wave to transmit the signal indicating the device ID from the information providing device 2 for check-in, it is possible to limit an area this signal can reach, and by periodically turning on a sound input through the sound input unit 39 of the user terminal 3, it is possible to control electric power consumed by the user terminal 3. On the other hand, by using a low-power radio signal standard such as BLE for transmission of the information processing device-existing signal or the terminal existing signal for checkout, it is possible to control electric power consumed by the information providing device 2 or the user terminal 3.

The checkout processing unit 115 may automatically dissolve the association by other methods. For example, the checkout request transmitting unit 215 may transmit the checkout request to the server 1 when operation for paying a fare has been detected. In this case, when the information providing device 2 has been put in a vehicle in which a passenger pays a fare at the end of use of the vehicle, it is possible to appropriately identify the end of use of the information providing device 2 by the user and to dissolve association between the device ID and the user ID. For example, the checkout request transmitting unit 215 may transmit the checkout request when the payment button of the taxi meter 43 is operated. Alternatively, the checkout request transmitting unit 215 may transmit the checkout request when the payment button of the payment terminal 44 is operated.

6. Operation of Information Providing System

Next, an operation of the information providing system S will be described with reference to FIG. 8 to FIG. 13. In an operation example described in the following, the information providing device 2 outputs the signal indicating the device ID with the sound wave. Also, the information providing device 2 outputs the signal indicating the device ID when the door of the taxi 4 is closed and it is detected that the taxi 4 starts moving. Also, the information providing device 2 automatically transmits the checkout request based on the communication condition between the information providing device 2 and the user terminal 3.

FIG. 8 is a flowchart illustrating an example of device ID transmission processing executed by the system controller 21 of the information providing device 2 according to the present embodiment. For example, when power of the information providing device 2 is turned on, the system controller 21 executes device ID transmission processing according to the information providing program.

As illustrated in FIG. 8, the device ID transmitting unit 211 sets a departure flag to FALSE (step S101). The departure flag indicating FALSE indicates that the taxi 4 does not depart yet. A departure flag indicating TRUE indicates that the taxi 4 has departed.

Then, the device ID transmitting unit 211 determines whether the check-in flag is TRUE (step S102). The check-in flag indicating TRUE indicates that a certain user finishes check-in and is using the information providing device 2. The check-in flag indicating FALSE indicates a state in which no user has checked in. Setting of the check-in flag is performed in checkout request processing and information providing processing described later. In a case of determining that the check-in flag is TRUE (step S102: YES), the device ID transmitting unit 211 advances the processing to step S110. On the other hand, in a case of determining that the check-in flag is not TRUE (step S102: NO), the device ID transmitting unit 211 advances the processing to step S103.

In step S103, the device ID transmitting unit 211 determines whether all doors of the taxi 4 are closed based on opened/closed states of the doors detected by the door sensor 41. When not determining that all the doors are closed (step S103: NO), the device ID transmitting unit 211 advances the processing to step S104. In step S104, the device ID transmitting unit 211 sets the departure flag to FALSE and advances the processing to step S110. On the other hand, when determining that all the doors are closed (step S103: YES), the device ID transmitting unit 211 advances the processing to step S105.

In step S105, the device ID transmitting unit 211 determines whether the departure flag is TRUE. When determining that the departure flag is TRUE (step S105: YES), the device ID transmitting unit 211 advances the processing to step S106. On the other hand, when determining that the departure flag is not TRUE (step S105: NO), the device ID transmitting unit 211 advances the processing to step S108.

In step S106, the device ID transmitting unit 211 determines whether a vehicle speed detected by the vehicle speed sensor 42 is 0 km/h. When determining that the vehicle speed is 0 km/h (step S106: YES), the device ID transmitting unit 211 advances the processing to step S110. On the other hand, when determining that the vehicle speed is not 0 km/h (step S106: NO), the device ID transmitting unit 211 advances the processing to step S107. In step S107, the device ID transmitting unit 211 sets the departure flag to TRUE and advances the processing to step S110.

In step S108, the device ID transmitting unit 211 generates a device ID corresponding to a current period by using a current date and time. Then, the device ID transmitting unit 211 causes the sound output unit 209 to output, with a sound wave, a signal indicating the generated device ID (step S109) and advances the processing to step S110.

In step S110, the device ID transmitting unit 211 determines whether the power of the information providing device 2 is turned off. When determining that the power is not turned off (step S110: NO), the device ID transmitting unit 211 advances the processing to step S102. On the other hand, when determining that the power is turned off (step S110: YES), the device ID transmitting unit 211 ends the device ID transmission processing.

FIG. 9 is a flowchart illustrating an example of checkout request processing executed by the system controller 21 of the information providing device 2 according to the present embodiment. For example, when the power of the information providing device 2 is turned on, the system controller 21 executes checkout request processing according to the information providing program.

As illustrated in FIG. 9, the signal transmitting/receiving unit 214 determines whether the check-in flag is TRUE (step S121). When determining that the check-in flag is not TRUE (step S120: NO), the signal transmitting/receiving unit 214 advances the processing to step S126. On the other hand, when determining that the check-in flag is TRUE (step S120: YES), the signal transmitting/receiving unit 214 advances the processing to step S122.

In step S122, the signal transmitting/receiving unit 214 causes the short-range radio communication unit 26 to transmit the information providing device existing signal. Then, the signal transmitting/receiving unit 214 determines whether the terminal existing signal is received from the user terminal 3 within a predetermined time from the transmission of the information providing device existing signal (step S123). When determining that the terminal existing signal is received (step S123: YES), the signal transmitting/receiving unit 214 advances the processing to step S126. On the other hand, when determining that the terminal existing signal is not received (step S123: NO), the signal transmitting/receiving unit 214 advances the processing to step S124.

In step S124, the checkout request transmitting unit 215 transmits a checkout request to the server 1. Next, the checkout request transmitting unit 215 sets the check-in flag to FALSE (step S125), and advances the processing to step S216.

In step S126, the signal transmitting/receiving unit 214 determines whether the power of the information providing device 2 is turned off. When determining that the power is not turned off (step S126: NO), the signal transmitting/receiving unit 214 advances the processing to step S121. On the other hand, when determining that the power is turned off (step S126: YES), the signal transmitting/receiving unit 214 ends the checkout request processing.

Figure 10:
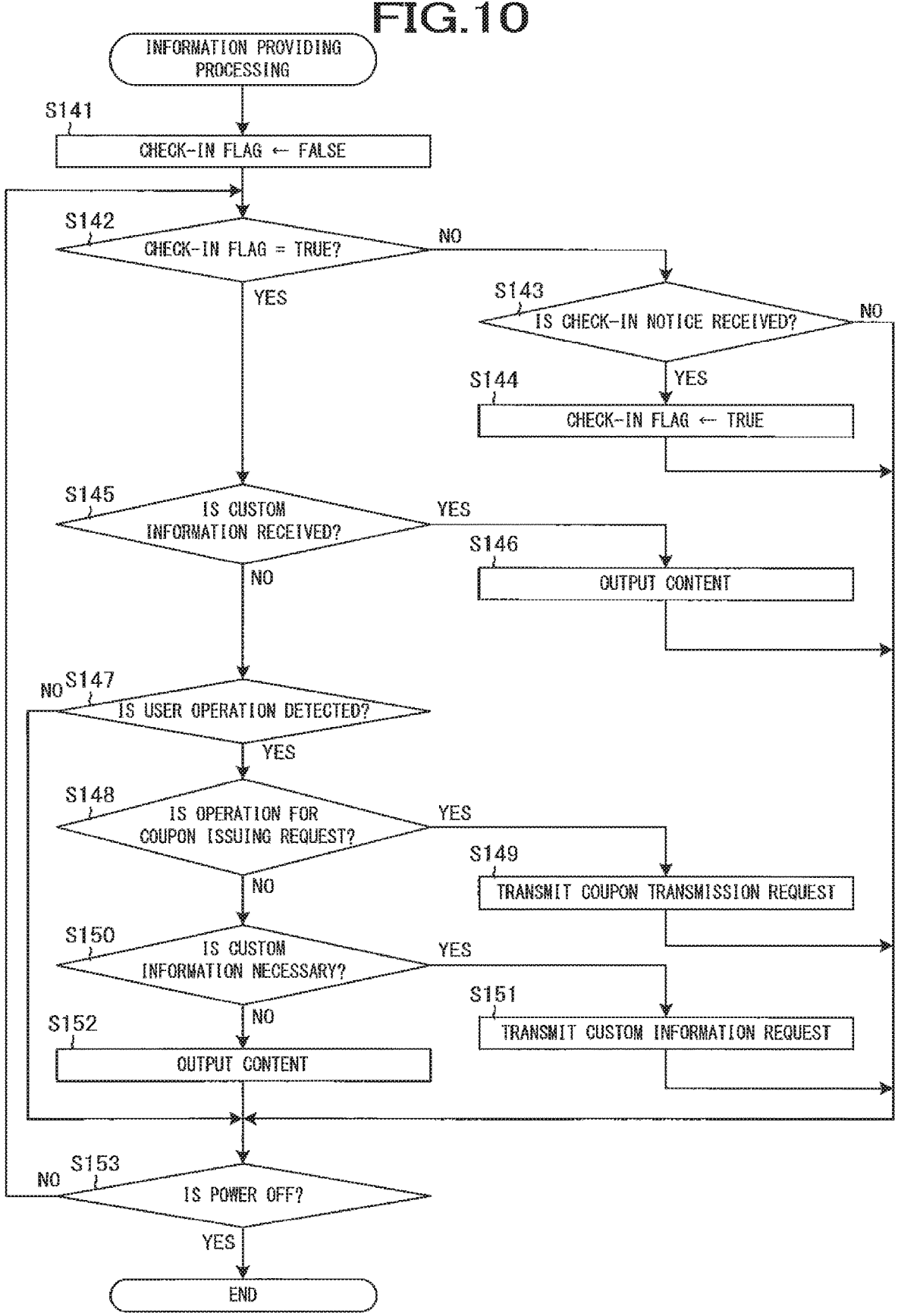
FIG. 10 is a flowchart illustrating an example of information providing processing executed by the system controller 21 of the information providing device 2 according to the one embodiment.

FIG. 10 is a flowchart illustrating an example of information providing processing executed by the system controller 21 of the information providing device 2 according to the present embodiment. For example, when the power of the information providing device 2 is turned on, the system controller 21 executes information providing processing according to an information providing program.

As illustrated in FIG. 10, the information providing unit 213 sets the check-in flag to FALSE (step S141). Then, the information providing unit 213 determines whether the check-in flag is TRUE (step S142). When determining that the check-in flag is TRUE (step S142: YES), the information providing unit 213 advances the processing to step S145. On the other hand, when determining that the check-in flag is not TRUE (step S142: NO), the information providing unit 213 advances the processing to step S143.

In step S143, the information providing unit 213 determines whether a check-in notice is received from the server 1. When determining that the check-in notice is received (step S143: YES), the information providing unit 213 advances the processing to step S144. In step S144, the information providing unit 213 sets the check-in flag to TRUE and advances the processing to step S153. On the other hand, when determining that the check-in notice is not received (step S143: NO), the information providing unit 213 advances the processing to step S153.

In step S145, the custom information receiving unit 212 determines whether custom information is received from the server 1. When determining that the custom information is received (step S145: YES), the custom information receiving unit 212 advances the processing to step S146. In step S146, the information providing unit 213 outputs content based on the received custom information and advances the processing to step S153. On the other hand, when determining that the custom information is not received (step S145: NO), the custom information receiving unit 212 advances the processing to step S147.

In step S147, the information providing unit 213 determines whether user operation is detected by the operation input unit 27. When determining that no user operation is detected (step S147: NO), the information providing unit 213 advances the processing to step S153. On the other hand, when determining that the user operation is detected (step S147: YES), the information providing unit 213 advances the processing to step S148.

In step S148, the coupon information transmission request transmitting unit 216 determines whether the detected operation is operation indicating a coupon issuing request. When determining that the detected operation is the operation indicating the coupon issuing request (step S148: YES), the coupon information transmission request transmitting unit 216 advances the processing to step S149. In step S149, the coupon information transmission request transmitting unit 216 transmits the coupon information transmission request to the server 1 and advances the processing to step S153. On the other hand, when determining that the detected operation is not the operation indicating the coupon issuing request (step S148: NO), the coupon information transmission request transmitting unit 216 advances the processing to step S150.

In step S150, the information providing unit 213 determines whether custom information for outputting content is necessary according to the detected operation. When determining that the custom information is necessary (step S150: YES), the information providing unit 213 advances the processing to step S151. In step S151, the information providing unit 213 transmits a custom information request to the server 1 and advances the processing to step S153. The custom information request may include, for example, a device ID and information indicating a kind of content to be output. On the other hand, when determining that the custom information is not necessary (step S152: NO), the information providing unit 213 advances the processing to step S152. In step S152, the information providing unit 213 outputs content according to the detected operation and advances the processing to step S153.

In step S153, the information providing unit 213 determines whether the power of the information providing device 2 is turned off. When determining that the power is not turned off (step S153: NO), the information providing unit 213 advances the processing to step S141. On the other hand, when determining that the power is turned off (step S153: YES), the information providing unit 213 ends the information providing processing.

Figure 11:
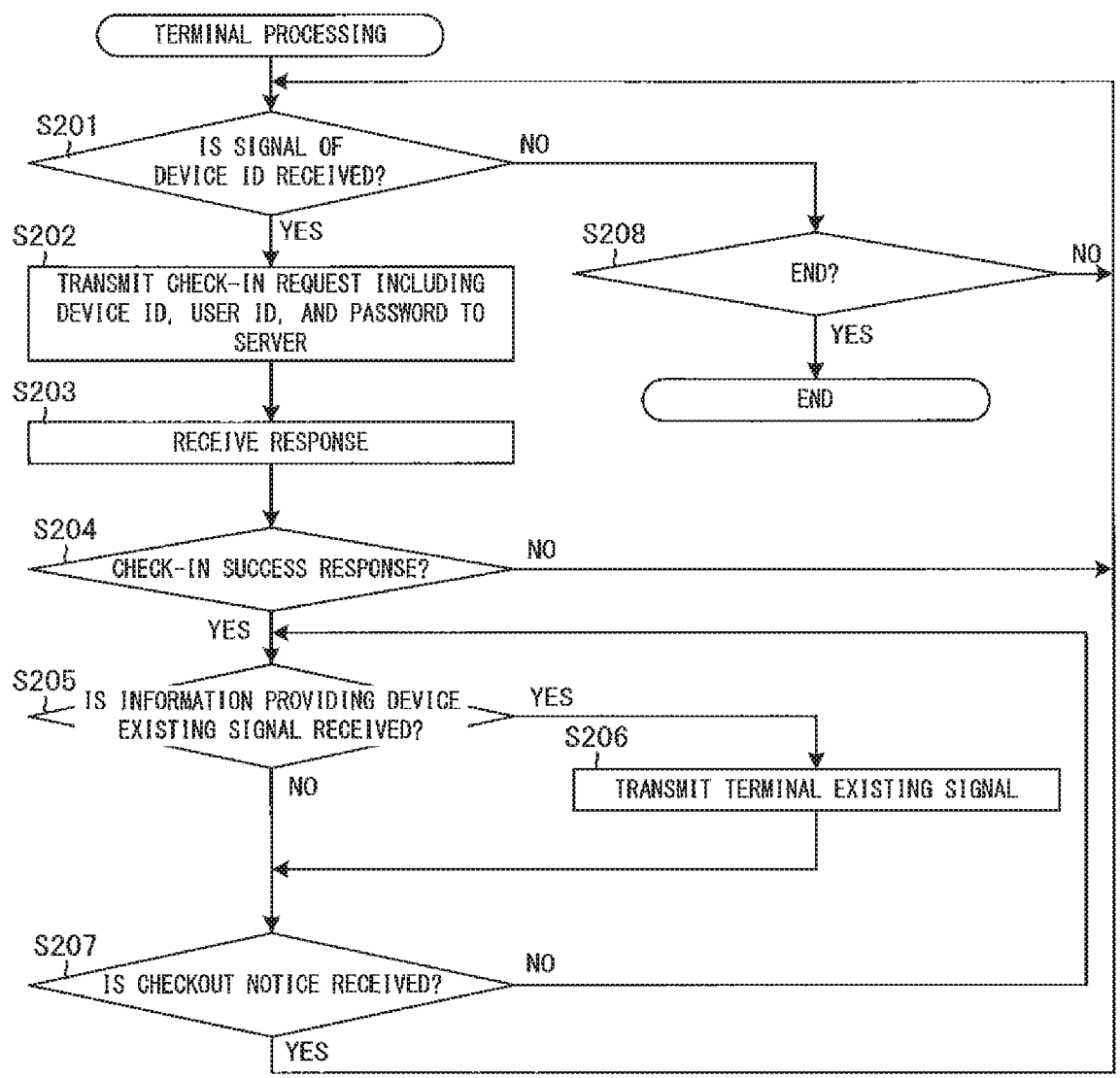
FIG. 11 is a flowchart illustrating an example of terminal processing executed by the system controller 31 of the user terminal 3 according to the one embodiment.

FIG. 11 is a flowchart illustrating an example of terminal processing executed by the system controller 31 of the user terminal 3 according to the present embodiment. For example, the system controller 31 starts the terminal program based on user operation, or the system controller 31 automatically starts the terminal program when the power of the user terminal 3 is turned on. The system controller 31 executes the terminal processing according to the terminal program.

As illustrated in FIG. 11, the device ID receiving unit 311 determines whether a signal indicating a device ID is received from any information providing device 2 based on detection of a sound wave by the sound input unit 39 (Step S201). When determining that the signal indicating a device ID is not received (step S201: NO), the device ID receiving unit 311 advances the processing to step S208. On the other hand, when determining that the signal indicating a device ID is received (step S201: NO), the device ID receiving unit 311 advances the processing to step S202.

In step S202, the check-in request transmitting unit 312 transmits, to the server 1, a check-in request including the received device ID, and a user ID and a password stored in the storage unit 34. Then, the check-in request transmitting unit 312 receives a response to the check-in request from the server 1 in (step S203). Then, the check-in request transmitting unit 312 determines whether the received response is a check-in success response (step S204). When determining that the received response is not the check-in success response (step S204: NO), the check-in request transmitting unit 312 advances the processing to step S201. On the other hand, when determining that the received response is the check-in success response (step S204: YES), the check-in request transmitting unit 312 advances the processing to step S205.

In step S205, the signal transmitting/receiving unit 313 determines whether an information providing device existing signal is received from the information providing device 2. When determining that the information providing device existing signal is received (step S205: YES), the signal transmitting/receiving unit 313 advances the processing to step S206. In step S206, the signal transmitting/receiving unit 313 transmits a terminal existing signal and advances the processing to step S207. On the other hand, when determining that the information providing device existing signal is not received (step S205: NO), the signal transmitting/receiving unit 313 advances the processing to step S207.

In step S207, the device ID receiving unit 311 determines whether a checkout notice is received from the server 1. When determining that the checkout notice is not received (step S207: NO), the device ID receiving unit 311 advances the processing to step S205. On the other hand, when determining that the checkout notice is received (step S207: YES), the device ID receiving unit 311 advances the processing to step S201.

In step S208, the device ID receiving unit 311 determines whether to end the execution of the terminal program based on user operation. When determining not to end the execution of the terminal program (step S208: NO), the device ID receiving unit 311 advances the processing to step S201. On the other hand, when determining to end the execution of the terminal program (step S208: YES), the device ID receiving unit 311 ends the terminal processing.

Figure 12:
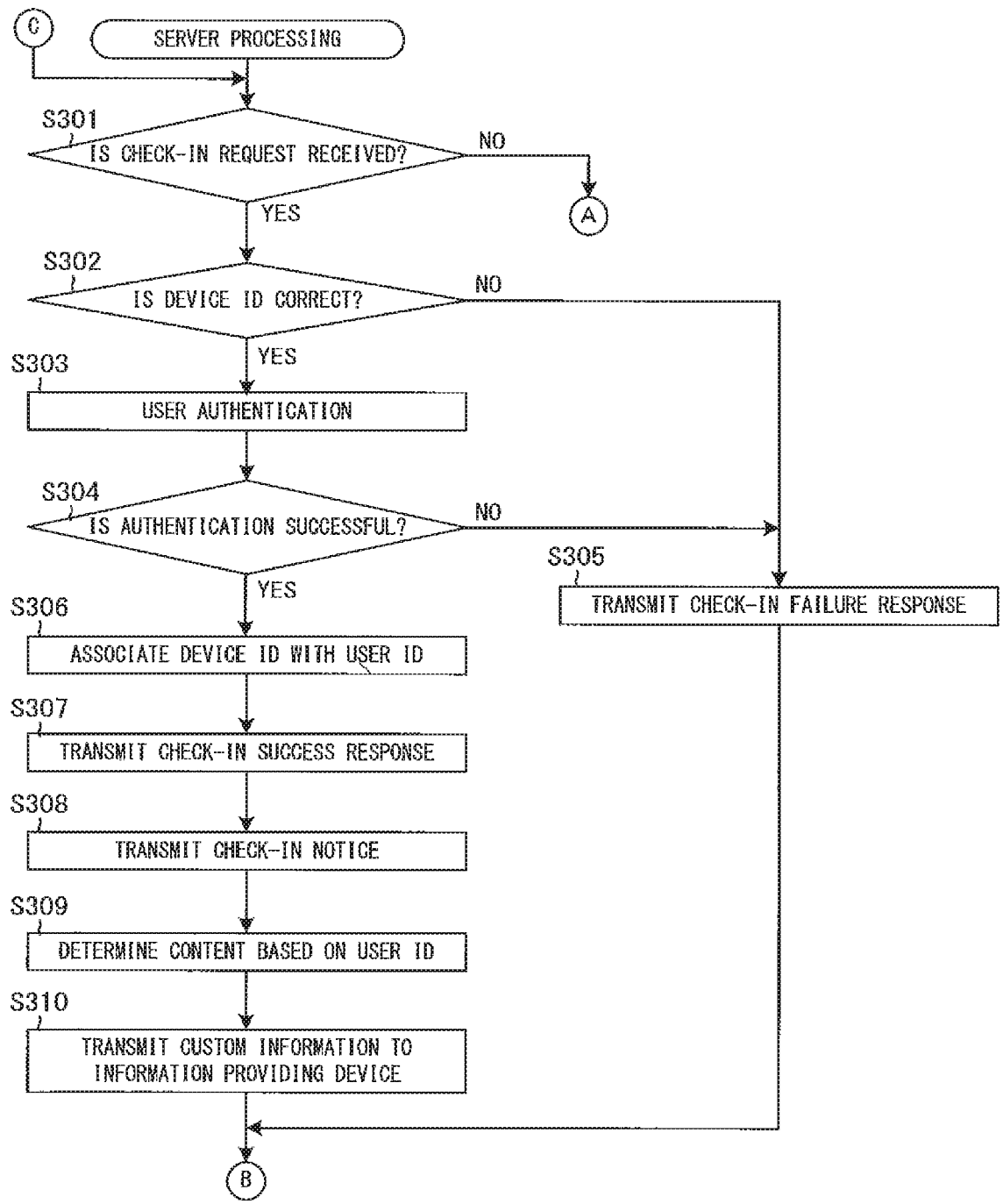
FIG. 12 is a flowchart illustrating an example of server processing executed by the system controller 11 of the server 1 according to the one embodiment.
Figure 13:
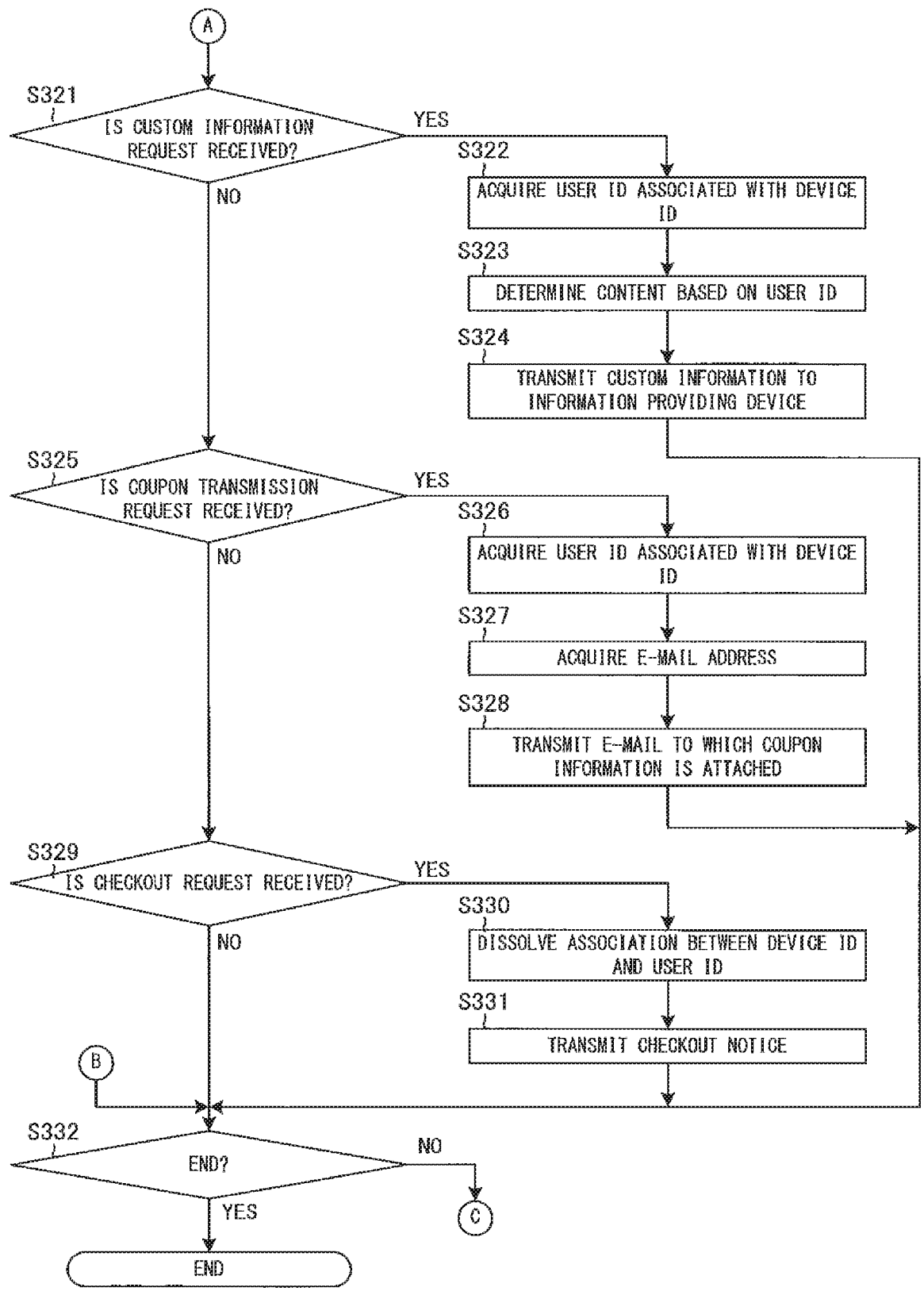
FIG. 13 is a flowchart illustrating an example of server processing executed by the system controller 11 of the server 1 according to the one embodiment.

FIG. 12 and FIG. 13 are flowcharts illustrating an example of server processing executed by the system controller 11 of the server 1 according to the present embodiment. For example, when the power of the server 1 is turned on, the system controller 11 executes the server processing according to a server program.

As illustrated in FIG. 12, the check-in request receiving unit 111 determines whether a check-in request is received from any user terminal 3 (step S301). When determining that a check-in request is not received (step S301: NO), the check-in request receiving unit 111 advances the processing to step S321. On the other hand, when determining that a check-in request is received (step S301: YES), the check-in request receiving unit 111 advances the processing to step S302.

In step S302, the check-in processing unit 112 determines whether a device ID included in the received check-in request is correct. For example, the check-in processing unit 112 generates key information by using a current date and time and decrypts the device ID by using the key information. The check-in processing unit 112 determines that the device ID is correct when the decrypted device ID corresponds to a device ID of any of information providing devices 2. When determining that the device ID is not correct (step S302: NO), the check-in processing unit 112 advances the processing to step S305. On the other hand, when determining that the device ID is correct (step S302: YES), the check-in processing unit 112 advances the processing to step S303.

In step S303, the check-in processing unit 112 performs user authentication by using a user ID and a password included in the received check-in request. Then, the check-in processing unit 112 determines whether the user authentication is successful (step S304). When determining that the user authentication is not successful (step S304: NO), the check-in processing unit 112 advances the processing to step S305. In step S305, the check-in processing unit 112 transmits a check-in failure response to the user terminal 3 that has transmitted the check-in request, and advances the processing to step S332. On the other hand, when determining that the user authentication is successful (step S304: YES), the check-in processing unit 112 advances the processing to step S306.

In step S306, the check-in processing unit 112 stores the device ID and the user ID, which are included in the check-in request, in the check-in management DB 14b in association with each other. Then, the check-in processing unit 112 transmits a check-in success response to the user terminal 3 that has transmitted the check-in request (step S307). Then, the check-in processing unit 112 transmits a check-in notice to an information providing device 2 identified by the device ID included in the check-in request (step S308). Then, based on the user ID included in the check-in request, the custom information transmitting unit 113 acquires information related to a user identified by the user ID. Based on the acquired information, the custom information transmitting unit 113 determines what information should be provided as information personalized for the user identified by the user ID (step S309). Then, the custom information transmitting unit 113 generates custom information based on this determination, and transmits the custom information to the information providing device 2 identified by the device ID included in the check-in request (step S310). Then, the custom information transmitting unit 113 advances the processing to step S332.

As illustrated in FIG. 13, the custom information transmitting unit 113 determines in step S321 whether a custom information request is received from any of the information providing devices 2. When determining that the custom information request is received (step S321: YES), the custom information transmitting unit 113 advances the processing to step S322. In step S322, the custom information transmitting unit 113 acquires, from the check-in management DB 14b, a user ID associated with a device ID included in the custom information request. Then, the custom information transmitting unit 113 determines what information should be provided as information personalized for the user based on the acquired user ID and information indicating a kind of content included in the custom information request (Step S323). Then, the custom information transmitting unit 113 generates custom information based on this determination, and transmits the custom information to the information providing device 2 that has transmitted the custom information request (step S324). Then, the custom information transmitting unit 113 advances the processing to step S332. On the other hand, when determining that the custom information request is not received (step S321: NO), the custom information transmitting unit 113 advances the processing to step S325.

In step S325, the coupon information transmission request receiving unit 116 determines whether a coupon information transmission request is received from any of the information providing devices 2. When determining that the coupon information transmission request is received (step S325: YES), the coupon information transmission request receiving unit 116 advances the processing to step S326. In step S326, the coupon information transmitting unit 117 acquires, from the check-in management DB 14b, a user ID associated with a device ID included in the coupon information transmission request. Then, the coupon information transmitting unit 117 acquires an e-mail address from user information stored in association with the acquired user ID in the user DB 14a (step S327). Then, the coupon information transmitting unit 117 transmits an e-mail which includes the acquired e-mail address as a receiver address and to which coupon information is attached (step S328). Then, the coupon information transmitting unit 117 advances the processing to step S332. On the other hand, when determining that the coupon information transmission request is not received (step S325: NO), the coupon information transmission request receiving unit 116 advances the processing to step S329.

In step S329, the checkout request receiving unit 114 determines whether a checkout request is received from any of the information providing devices 2. When determining that the checkout request is received (step S329: YES), the checkout request receiving unit 114 advances the processing to step S330. In step S330, the checkout processing unit 115 deletes, from the check-in management DB 14b, a device ID included in the checkout request and a user ID associated with this device ID, and dissolves the association. Then, the checkout processing unit 115 transmits a checkout notice to a user terminal 3 used by a user indicated by the deleted user ID (step S331), and advances the processing to step S332. On the other hand, when determining that the checkout request is not received (step S329: NO), the checkout request receiving unit 114 advances the processing to step S332.

In step S332, the custom information transmitting unit 113 determines whether the power of the server 1 is turned off. When determining that the power is not turned off (step S332: NO), the custom information transmitting unit 113 advances the processing to step S301. On the other hand, when determining that the power is turned off (step S332: YES), the custom information transmitting unit 113 ends the server processing.

As described above, according to the present embodiment, the server 1 receives, from a user terminal 3 that has acquired a device ID identifying an information providing device 2, the device ID and a user ID identifying a user. Also, the server 1 transmits custom information for the user identified by the received user ID to the information providing device 2 identified by the received device ID. Also, the information providing device 2 receives the custom information transmitted from the server 1. Also, the information providing device 2 provides information based on the received custom information. Thus, the information providing device 2 can provide information personalized for the user without an input of identification information of the user into the information providing device 2.

Also, the information providing device 2 may output a device ID. In this case, the user terminal 3 can acquire the device ID output from the information providing device 2 that the user intends to use.

Also, the information providing device 2 may change a device ID to be output each time a predetermined period passes. Also, the server 1 may transmit custom information when the device ID received from the user terminal 3 is a device ID corresponding to a period in which the device ID is received. In this case, it is possible to prevent provision of information personalized for a user different from a user who is currently about to use the information providing device 2.

Also, the information providing device 2 may output a signal indicating a device ID. Also, the server 1 may receive a device ID and a user ID transmitted from the user terminal 3 when the user terminal 3 receives the signal indicating the device ID. In this case, it is possible to save the user the trouble of inputting the device ID into the user terminal 3.

Also, the information providing device 2 may have been put in a predetermined space separated from the outside. Also, the information providing device 2 may output a signal indicating the device ID only when a door for entering the predetermined space is closed. In this case, since the signal indicating the device ID hardly reaches the outside of the predetermined space, the probability that the device ID is received only by a user terminal 3 of a user in the predetermined space can be increased.

Also, the information providing device 2 may have been put in a vehicle. Also, the information providing device 2 may output a device ID when movement of the vehicle is detected. In this case, when the probability that the user is using the vehicle is high, the signal indicating the device ID can be output.

Also, the information providing device 2 may output a sound wave indicating a device ID. In this case, since a sound wave is blocked by an obstacle or a sound wave reaching an opposite side of the obstacle is weakened, it becomes easy to limit an area that a signal indicating the device ID reaches.

Also, the server 1 may associate a device ID and a user ID received from the user terminal 3 with each other. Also, the server 1 may transmit custom information for a user identified by a user ID associated with a device ID of an information providing device 2 to the information providing device 2. In this case, the information providing device 2 can provide information personalized for the user while the association is maintained.

Also, when a predetermined signal transmitted from either one of the information providing device 2 and the user terminal 3 is not received by the other device, the server 1 may receive a checkout request transmitted from the other device. Also, when the checkout request is received, the server 1 may dissolve association between the device ID and the user ID. In this case, association can be dissolved when the probability that the user has ended use of the information providing device 2 is high.

Also, the information providing device 2 may be put in a vehicle in which a fare is paid when a passenger ends use of the vehicle. Also, the information providing device 2 may transmit a checkout request to the server 1 when operation for paying the fare has been detected. In this case, association can be dissolved when the probability that the user has ends use of the information providing device 2 is high.

Also, the information providing device 2 may include an operation input unit 27 to which operation by a user is input. Also, the information providing device 2 may transmit a coupon information transmission request to the server 1 based on the operation input through the operation input unit 27. Also, the server 1 may receive the coupon information transmission request from the information providing device 2. Also, when receiving the coupon information transmission request is received, the server 1 may transmit coupon information for a user identified by a user ID associated with a device ID of the information providing device 2 that has transmitted the coupon information transmission request. In this case, the user can receive the coupon information without inputting the user ID of the user into the information providing device 2.

REFERENCE SIGNS LIST 1 server
2 information providing device
3 user terminal
11 system controller
12 system bus
13 input/output interface
14 storage unit
14a user DB
14b check-in management DB
15 communication unit
111 check-in request receiving unit
112 check-in processing unit
113 custom information transmitting unit
114 checkout request receiving unit
115 checkout processing unit
116 coupon information transmission request receiving unit
117 coupon information transmitting unit
21 system controller
22 system bus
23 input/output interface
24 storage unit
25 mobile radio communication unit
26 short-range radio communication unit
27 operation input unit
28 display unit
29 sound output unit
211 device ID output unit
212 custom information receiving unit
213 information providing unit
214 signal transmitting/receiving unit
215 checkout request transmitting unit
216 coupon information transmission request transmitting unit
31 system controller
32 system bus
33 input/output interface
34 storage unit
35 mobile radio communication unit
36 short-range radio communication unit
37 operation input unit
38 display unit
39 sound input unit
40 camera unit
311 device ID acquiring unit
312 check-in request transmitting unit
313 signal transmitting/receiving unit
NW network

The invention claimed is:

1. An information providing system comprising:
a server device configured to communicate with a terminal device carried by a user; and
an information providing device configured to communicate with the server device and be put inside a vehicle,
wherein the server device includes:
at least one server memory configured to store computer program code;
at least one server processor configured to read the computer program code and operate as instructed by the computer program code, the computer program code including:
identification information receiving code configured to cause at least one of the at least one server processor to receive, from the terminal device that has received a signal indicating device identification information identifying the information providing device, the device identification information and user identification information identifying the user,
for-user information transmitting code configured to cause at least one of the at least one server processor to transmit information for the user identified by the received user identification information to the information providing device identified by the received device identification information,
association code configured to cause at least one of the at least one server processor to associate the device identification information and the user identification information received from the terminal device with each other,
request receiving code configured to cause at least one of the at least one server processor to receive a dissolving request transmitted from a signal receiving device, wherein the dissolving request is received from the signal receiving device in response to the signal receiving device receiving no predetermined signal from a signal transmitting device, wherein the signal receiving device is one of the terminal device and the information providing device, and wherein the signal transmitting device is one of the terminal device and the information providing device that is not the signal receiving device, and
dissolving code configured to cause at least one of the at least one server processor to dissolve the association between the device identification information and the user identification information in response to the dissolving request being received, and
the information providing device includes:
at least one device memory configured to store computer program code;
at least one device processor configured to read the computer program code and operate as instructed by the computer program code, the computer program code including:
output code configured to cause at least one of the at least one device processor to output the signal indicating the device identification information in response to a door for entering the vehicle being closed, and prevent the output of the signal in response to the door being open;
for-user information receiving code configured to cause at least one of the at least one device processor to receive the information for the user transmitted from the server device, and providing code configured to cause at least one of the at least one device processor to provide information based on the received information for the user.

2. The information providing system according to claim 1, wherein the output code is configured to cause at least one of the at least one device processor to change the device identification information to be output each time a predetermined period passes and outputs the device identification information changed corresponding to a current period, and the for-user information transmitting code is configured to cause at least one of the at least one server processor to transmit the information for the user in response to the received device identification information being device identification information corresponding to a period in which the device identification information is received.

3. The information providing system according to claim 1, wherein the output code is configured to cause at least one of the at least one device processor to output a signal indicating the device identification information, and the identification information receiving code configured to cause at least one of the at least one server processor to receive the device identification information and the user identification information transmitted from the terminal device in response to the signal indicating the device identification information having been received by the terminal device.

4. The information providing system according to claim 3, wherein the output code is configured to cause at least one of the at least one device processor to output, as the signal, a sound wave indicating the device identification information.

5. The information providing system according to claim 1, wherein the server device further includes the for-user information transmitting code is configured to cause at least one of the at least one server processor to transmit, to the information providing device, the information for the user identified by the user identification information associated with the device identification information of the information providing device.

6. The information providing system according to claim 5, wherein the information providing device is configured to be put in a vehicle in which a fare is paid when a passenger ends use of the vehicle, the information providing device further includes request transmitting code configured to cause at least one of the at least one device processor to transmit a dissolving request to the server device based on an operation to pay a fare being detected, and the server device further includes the dissolving code being configured to cause at least one of the at least one server processor to, in response to the dissolving request being received from the information providing device, dissolving the association between the device identification information of the information providing device that has transmitted the dissolving request, and the user identification information.

7. The information providing system according to claim 5, wherein the information providing device further includes an input device to which an operation by the user is input, and transmission request transmitting code configured to cause at least one of the at least one device processor to transmit, to the server device, a transmission request for coupon information to the user based on the input operation, and the server device further includes transmission request receiving code configured to cause at least one of the at least one server processor to receive the transmission request from the information providing device, and coupon information transmitting code configured to cause at least one of the at least one server processor to transmit, in response to the transmission request being received, the coupon information for the user identified by the user identification information associated with the device identification information of the information providing device that has transmitted the transmission request.

8. A non-transitory computer-readable medium storing instructions that, when executed cause a first processor among at least one processors to:

receive, from the terminal device that has received a signal indicating device identification information identifying the information providing device, the device identification information and user identification information identifying the user, transmit information for the user identified by the received user identification information to the information providing device identified by the received device identification information associate the device identification information and the user identification information received from the terminal device with each other, receive a dissolving request transmitted from a signal receiving device, wherein the dissolving request is received from the signal receiving device in response to the signal receiving device receiving no predetermined signal from a signal transmitting device, wherein the signal receiving device is one of the terminal device and the information providing device, and wherein the signal transmitting device is one of the terminal device and the information providing device that is not the signal receiving device, and dissolve the association between the device identification information and the user identification information in response to the dissolving request being received, and wherein the instructions, when executed, cause a second processor among at least one processors, located inside a vehicle, to:

receive information for the user transmitted from the server device, provide information based on the received information for the user; and output the signal indicating the device identification information in response to a door for entering the vehicle being closed and to prevent output of the signal in response to the door for entering the vehicle being open.

9. The non-transitory computer readable medium according to claim 8, wherein the output code is configured to cause at least one of the at least one device processor to output the device identification information in a response to a movement of the vehicle having been detected.

10. An information providing method performed by an information providing device in an information providing system comprising a server device, wherein the server device is configured to communicate with a terminal device carried by a user, the method comprising:

receiving, from the terminal device that has received a signal indicating device identification information identifying the information providing device, the device identification information and user identification information identifying the user, transmitting information for the user identified by the received user identification information to the information providing device identified by the received device identification information, associating the device identification information and the user identification information received from the terminal device with each other, receiving a dissolving request transmitted from a signal receiving device, wherein the dissolving request is received from the signal receiving device in response to the signal receiving device receiving no predetermined signal from a signal transmitting device, wherein the signal receiving device is one of the terminal device and the information providing device, and wherein the signal transmitting device is one of the terminal device and the information providing device that is not the signal receiving device, and dissolving the association between the device identification information and the user identification information in response to the dissolving request being received, and wherein the information providing device is configured to communicate with the server device and is placed inside a vehicle, the method comprising:

receiving, by the information providing device, the information for the user transmitted from the server device, providing, by the information providing device, information based on the received information for the user, and outputting, by the information processing device, a signal indicating the device identification information in response to a door for entering the vehicle being closed, and preventing the output of the signal indicating the device identification information in response to the door being open.

* * * * *